United States Patent
Kitaura et al.

(10) Patent No.: US 8,613,434 B2
(45) Date of Patent: Dec. 24, 2013

(54) WORK PALLET POSITIONING AND FIXING DEVICE

(75) Inventors: Ichiro Kitaura, Hyogo (JP); Takayuki Munechika, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 514 days.

(21) Appl. No.: 12/735,546

(22) PCT Filed: Jan. 20, 2009

(86) PCT No.: PCT/JP2009/000179
§ 371 (c)(1),
(2), (4) Date: Jul. 26, 2010

(87) PCT Pub. No.: WO2009/096150
PCT Pub. Date: Aug. 6, 2009

(65) Prior Publication Data
US 2010/0308524 A1    Dec. 9, 2010

(30) Foreign Application Priority Data

Jan. 28, 2008   (JP) ................................ 2008-016406
May 28, 2008   (JP) ................................ 2008-139515
Sep. 17, 2008   (JP) ................................ 2008-237739

(51) Int. Cl.
*B23Q 3/00*        (2006.01)
(52) U.S. Cl.
USPC ..................................... 269/313; 269/289 R
(58) Field of Classification Search
USPC .............................. 269/309, 310, 313, 289 R
See application file for complete search history.

(56) References Cited

U.S. PATENT DOCUMENTS

| 2,536,899 | A | 1/1951 | Andrews et al. | |
| 5,370,378 | A | 12/1994 | Weber et al. | |
| 5,487,539 | A | 1/1996 | Obrist | |
| 6,527,266 | B1 | 3/2003 | Yonezawa et al. | |
| 6,905,117 | B2 * | 6/2005 | Bernhard et al. | 269/309 |
| 6,955,347 | B2 * | 10/2005 | Kawakami et al. | 269/309 |
| 7,819,392 | B2 * | 10/2010 | Kuroda et al. | 269/309 |

(Continued)

FOREIGN PATENT DOCUMENTS

| EP | 1410874 A1 * | 4/2004 | .............. B23Q 3/00 |
| JP | 6-320371 | 11/1994 | |

(Continued)

*Primary Examiner* — Joshua J Michener
*Assistant Examiner* — Elizabeth A Plummer
(74) *Attorney, Agent, or Firm* — Jordan and Hamburg LLP

(57) ABSTRACT

A positioning and fixing device positions a work pallet in the vertical and horizontal directions relative to a base member via a ring member, and also restricts its rotation around the vertical axis. The base member has Z reference surfaces that can stop a lower end reference surface of the ring member and position it in the vertical direction, and a tapered male engagement portion whose horizontal cross section is formed as a regular polygon having a plurality of outwardly convex circular arcuate vertex portions and a plurality of side portions, and that reduces in diameter upwards. The ring member has a tapered female engagement portion that can engage with the tapered male engagement portion so that its lower end reference surface is in contact against the Z reference surfaces. A clamp mechanism for fixing the ring member to the base member is provided, and the side portions of at least one of the tapered female engagement portion and the tapered male engagement portion are adapted to engage in close contact with the other via elastic deformation.

21 Claims, 25 Drawing Sheets

(56) References Cited

U.S. PATENT DOCUMENTS

| | | | |
|---|---|---|---|
| 8,047,520 B2 * | 11/2011 | Kuroda | 269/309 |
| 8,177,210 B2 * | 5/2012 | Kitamura et al. | 269/309 |
| 2004/0113346 A1 | 6/2004 | Kawakami et al. | |
| 2007/0001360 A1 * | 1/2007 | Haruna | 269/309 |
| 2007/0267794 A1 * | 11/2007 | Kuroda | 269/25 |
| 2008/0061486 A1 * | 3/2008 | Kuroda et al. | 269/48.1 |

FOREIGN PATENT DOCUMENTS

| | | | |
|---|---|---|---|
| JP | 7-314270 | 12/1995 | |
| JP | 2001-038564 | 2/2001 | |
| JP | 2003-039264 | 2/2003 | |
| JP | 2005-040922 | 2/2005 | |
| JP | 2010099785 A * | 5/2010 | |
| WO | WO 03009964 A1 * | 2/2003 | B23Q 3/00 |
| WO | WO 2008136049 A1 * | 11/2008 | B23Q 1/00 |

\* cited by examiner

WORK PALLET POSITIONING AND FIXING DEVICE

TECHNICAL FIELD

The present invention relates to a work pallet positioning and fixing device, and relates to a structure that is adapted to position the work pallet in three dimensions and also to restrain its rotation around the vertical axis, with a single device set that includes a ring member provided to the work pallet, and a base member that is engaged to this ring member.

BACKGROUND TECHNOLOGY

In the prior art, with a machine tool such as a machining center or the like, a workpiece to be supplied for machine processing is loaded onto the machine tool in the fixed state to a work pallet. In order to position and fix this work pallet on the table of the machine tool with good accuracy, a plurality of clamp mechanisms are equipped that are capable of positioning the work pallet on the table.

With the clamp device for a pallet of Patent Document #1, female side taper bushes 34 in which tapered holes 25 or concave portions 32 are formed are fixed at four spots upon the lower surface of a work pallet 20. And to the table side there are provided four sets of clamp mechanisms 30, 31, which engage to the four female side taper bushes 34 and clamp to them by ball lock mechanisms. Two of the sets of female side taper bush 34 and clamp mechanism 30, which are in a diagonal relationship across the center of the pallet 20, are able to position and clamp the work pallet 20 in the vertical direction and in the horizontal direction. And the other two sets of female side taper bush 34 and clamp mechanism 31 are capable of clamping the work pallet 20 in the vertical direction.

With the clamp device having a datum function of Patent Document #2, in order to position and fix a work pallet 3, four sets of clamp mechanism 4a, 5a, 6a, and 6a are provided to a base member 2. And four engagement ring members 4b, 5b, 6b, and 6b are provided to the lower portion of the work pallet 3, corresponding to the clamp mechanisms 4a, 5a, 6a, and 6a. It is arranged to be possible to clamp the work pallet by positioning in the vertical direction and in the horizontal direction with the two sets of clamp mechanisms 4a, 5a and the two engagement ring members 4b, 5b that are in a diagonal relationship, and it is arranged to be possible to clamp the work pallet 3 with the other two sets of clamp mechanisms 6a, 6a and the two engagement ring members 6b, 6b.

With the devices described in these Patent Documents #1 and #2, since at least four clamp mechanisms and two sets of positioning mechanism in the vertical and the horizontal direction are provided, accordingly the overall number of components that make up such a device for positioning and fixing a work pallet is large, and also the structure is complicated, the space required for installation is great, and the manufacturing cost is high.

Moreover, since this structure supports and fixes the work pallet at four locations, accordingly it is difficult to support the central portion of the work pallet, and elastic deformation of the work pallet easily takes place.

And, in the case of a compact work pallet, a difficulty is also encountered from the point of view of ensuring sufficient space for installation of the four clamp mechanisms.

With the work holding system described in Patent Document #3, there are provided a base side reception unit 1 and an adapter 74 fixed to the work pallet. An annular male polygon member 25 is fixed by bolts to an outer circumferential portion of the reception unit 1 than a central stepped portion thereof. A tapered outer circumferential surface that reduces upwards is formed on this male polygon member 25, and this tapered outer circumferential surface is formed in a triangular shape as seen in plan view.

A female polygon member 87 having a tapered inner circumferential surface capable of engaging with the tapered outer circumferential surface of the male polygon member 25 is fixed by bolts to the adapter 74, and moreover a wear ring member 90 is fixed thereto by bolts so as to contact against the upper end surface of the male polygon member 25. The work pallet is lowered from above the reception unit 1, so that the tapered inner circumferential surface of the female polygon member 87 on the work pallet side engages with the tapered outer circumferential surface of the male polygon member 25, and the wear ring member 90 is contacted against the upper end surface of the male polygon member 25. thereby, not only is the work pallet positioned in the vertical direction and in the horizontal direction, but also relative rotation around the vertical axis is restrained, and it is fixed to the reception unit 1 by a ball lock mechanism provided to the reception unit 1 that includes an air cylinder and a compression spring.

Furthermore, with the tool assembly described in Patent Document #4, a structure is provided in which a tapered projection 15 whose cross section is non-circular is formed on the base end portion of a tool 12, a tapered concave portion 25 into which the tapered projection 15 can fit is formed on a holder 11, and the tapered projection 15 is fitted into the tapered concave portion 25 and is fixed thereinto by a bolt.
Patent Document #1: Japanese Laid-Open Patent Publication H07-314270
Patent Document #2: Japanese Laid-Open Patent Publication 2001-38564
Patent Document #3: U.S. Pat. No. 5,370,378 Publication
Patent Document #4: U.S. Pat. No. 2,536,899 Publication

DISCLOSURE OF THE INVENTION

Problems to be Solved by the Invention

With the workpiece holding system of Patent Document #3, since a structure is employed in which the male polygon member 25, that constitutes an annular member, is fixed to the reception unit 1 by a plurality of bolts, accordingly it becomes easy for the accuracy of the shape of its tapered outer circumferential surface to become deteriorated due to a gap between this male polygon member 25 and the reception unit, or due to a minute gap between the male polygon member 25 and one of the bolts. And since a structure is also employed in which the female polygon member 87, that also constitutes an annular member, is fixed to the adapter 74 by a plurality of bolts, accordingly, in a similar manner to that described above, it becomes easy for the accuracy of the shape of its tapered inner circumferential surface to become deteriorated. As a result, it becomes difficult for the positioning accuracy of the work pallet with respect to the reception unit 1 to be enhanced as far as, for example, 2 or 3 µm.

In order to engage the tapered inner circumferential surface of the female polygon member 87 in close contact with the tapered outer circumferential surface of the male polygon member 25, it is necessary to adjust the thickness of the wear ring precisely, and this precise adjustment takes a great deal of labor and time. Moreover if, when bringing in and fixing the work pallet, some deviation occurs in the rotational dislocation phase around the vertical axis of the tapered outer circumferential surface and the tapered inner circumferential surface, then there is a possibility that the tapered outer circumferential surface and the tapered inner circumferential surface may be damaged.

Since a piston rod of an air cylinder in the ball lock mechanism is formed large in diameter, and an inclined portion for ball driving and a concave portion for ball retraction are formed on the outer circumferential surface portion of this piston rod, accordingly the piston rod is increased in diameter and the air cylinder is increased in size, so that the manufacturing cost becomes high.

Objects of the present invention are to provide a work pallet positioning and fixing device with which the accuracy of the shapes of tapered male and female engagement portions can be enhanced, and that can provide two-surface restraint and rotational restraint at high accuracy, etc.

Means to Solve the Problems

According to the work pallet positioning and fixing device of the present invention, a work pallet positioning and fixing device including a ring member that is provided to a work pallet and a base member to which the ring member can engage from above, and that positions the ring member with respect to the base member in a vertical direction and a horizontal direction and also restrains rotation of the ring member with respect to the base member about a vertical axis, is characterized in that: the base member includes a vertical axis, a Z reference surface for stopping a lower end reference surface of the ring member to position the ring member in the vertical direction, and a tapered male engagement portion whose horizontal cross section is formed as a regular polygon that has a plurality of circular arcuate vertex portions that are convex outward and a plurality of side portions, and which reduces in diameter upwards, and this tapered male engagement portion is formed integrally with the base member; the ring member includes a vertical axis and a tapered female engagement portion that is formed to be capable of engaging with the tapered male engagement portion so that the lower end reference surface comes into contact against the Z reference surface, and moreover whose horizontal cross section is formed as a regular polygon that has a plurality of circular arcuate vertex portions that are convex outward and a plurality of side portions, and this tapered female engagement portion is formed integrally with the ring member; a clamp mechanism is provided for fixing the ring member to the base member; and the tapered female engagement portion is adapted to engage in close contact with the tapered male engagement portion, by elastic deformation in a radial direction of at least one of an external circumferential side wall portion of the tapered female engagement portion and the internal circumferential side wall portion of the tapered male engagement portion.

When positioning a work pallet by engaging it to the base member, it is possible to perform this positioning in the horizontal direction and in the vertical direction by engaging the tapered female engagement portion that is provided to the work pallet to the tapered male engagement portion of the base member, and by stopping the lower end reference surface of the ring member against the Z reference surface of the base member. And it is possible to fix the work pallet to the base member in this state with the clamp mechanism. Since the tapered male engagement portion is formed as a regular polygon whose horizontal cross section has a plurality of circular arcuate vertex portions that are convex outward and a plurality of side portions, accordingly the tapered female engagement portion, that also has a plurality of circular arcuate vertex portions and a plurality of side portions, does not relatively rotate about the vertical axis with respect to the tapered male engagement portion.

Advantages of the Invention

Since, according to the present invention, the tapered male engagement portion of the base member is formed integrally with the base member, accordingly it is possible to reduce the causes of error during manufacture of this tapered male engagement portion, and thus to enhance the accuracy of the shape of this tapered male engagement portion. In a similar manner, since the tapered female engagement portion of the ring member is formed integrally with the ring member, accordingly it is possible to reduce the causes of error during manufacture of this tapered female engagement portion, and thus to enhance the accuracy of the shape of this tapered female engagement portion.

Since the above structure is provided in which the tapered female engagement portion of the ring member can engage with the tapered male engagement portion in the state in which its lower end reference surface is contacted against the Z reference surface, and since the tapered female engagement portion is engaged in close contact with the tapered male engagement portion by elastic deformation in the radial direction of at least one of the external circumferential side wall portion of the tapered female engagement portion and the internal circumferential side wall portion of the tapered male engagement portion, accordingly it is possible to attain two-direction restraint via this elastic deformation. Due to this it is possible reliably to attain two-direction restraint without performing delicate adjustment of the position in the height direction of the lower end reference surface or of the Z reference surface, and also without using any movable member in either the tapered male engagement portion or the tapered female engagement portion.

Since the tapered male engagement portion has a structure in which the horizontal cross section is formed as a regular polygon that has a plurality of circular arcuate vertex portions that are convex outward and a plurality of side portions, and moreover reduces in diameter upwards, accordingly it is possible reliably to restrain rotation of the work pallet with respect to the base member, via engagement between the tapered male engagement portion and the tapered female engagement portion.

In addition to the structure described above, it would also be acceptable to employ the following types of structure.

(1) The clamp mechanism may include a hydraulic cylinder for clamping and a ball lock mechanism which is provided on the base member and a ring member. According to this structure, two-direction restraint is provided by the Z reference surface of the base member and the lower end reference surface of the ring member, and by the tapered male engagement portion and the tapered female engagement portion, and, with the tapered male engagement portion and the tapered female engagement portion, it is possible to restrain rotation and also to fix the ring member strongly to the base member.

(2) The ball lock mechanism may include: a barrel portion formed at an upper end portion of the base member and inserted into a circular aperture in the ring member; a plurality of ball reception holes formed in the barrel portion; a plurality of balls, each of which is held in one of the plurality of ball reception holes and is movable in the radial direction; a plurality of ball reception grooves formed on an internal circumferential portion of an upper end portion of the ring member, so as to correspond to the plurality of ball reception holes; a circular plate member provided at an upper end portion of a piston rod of the hydraulic cylinder and disposed to slide freely up and down in the barrel portion; and a plurality of inclined portions for ball driving and a plurality of concave portions for ball retraction formed on an external circumferential portion of the circular plate member so as to correspond to the plurality of ball reception holes. Since, according to this structure, this ball lock mechanism has the plurality of ball reception grooves formed on the internal circumferential portion of the upper end portion of the ring member so as to correspond to the plurality of ball reception holes, accordingly, because the balls are contacted against the ball reception grooves in linear contact rather than in point contact, it becomes difficult for the balls to suffer damage by pressure, and the durability is enhanced. And, since this circular plate member is provided at the upper end portion of the piston rod of the hydraulic cylinder, and this circular plate member is disposed so as to slide freely up and down in the interior of the tubular portion, and since the plurality of inclined portions for ball driving and the plurality of concave portions for ball retraction are provided in the external circumferential portion of this circular plate member and are formed so as to correspond to the plurality of ball reception holes, accordingly it is possible to reduce the diameter of a large portion of the piston rod, so that it is possible to anticipate that the hydraulic cylinder will be manufactured as more compact.

(3) The tapered male engagement portion may be positioned more to the radial interior than a conical surface that contains the plurality of balls and the Z reference surface. Since, according to this structure, a force acts to press the tapered female engagement portion inward when the work pallet is engaged and clamped to the base member, accordingly elastic deformation of at least one of the plurality of side portions of the tapered female engagement portion and the plurality of side portions of the tapered male engagement portion is promoted, so that it is possible to engage the tapered female engagement portion to the tapered male engagement portion in close contact.

(4) The plurality of ball reception holes and the plurality of balls provided to the barrel portion of the base member may be positioned so as to correspond to central portions of the plurality of side portions of the tapered male engagement portion. According to this structure, during clamping with the ball lock mechanisms, the plurality of side portions of the tapered female engagement portion are pressed towards the plurality of side portions of the tapered male engagement portion, so that it is possible to engage the tapered female engagement portion closely to the tapered male engagement portion.

(5) There may further be included: an annular air chamber defined between the base member and the circular plate member, to which pressurized air is supplied; a plurality of air nozzles that are formed in the barrel portion, so as to communicate with the air chamber; a plurality of horizontal air nozzles for blowing air between the lower end reference surface and the Z reference surface; and a plurality of air passages that supply pressurized air from the air chamber to the plurality of horizontal air nozzles.

Since, according to this structure, during engagement and clamping of the ring to the base member, pressurized air is supplied to the air chamber, and pressurized air is ejected from the plurality of horizontal air nozzles and is blown against the lower end reference surface and the Z reference surface, accordingly foreign matter such as swarf or the like does not remain in between these surfaces to cause an obstruction. And, in a similar manner, since pressurized air is ejected from the plurality of air nozzles and is blown in against the tapered male engagement portion and the tapered female engagement portion, accordingly foreign matter such as swarf or the like also does not remain in between the tapered male engagement portion and the tapered female engagement portion to cause an obstruction. And, since the air is blown in at a wide angle towards the entire area of the Z reference surface, accordingly it is possible to enhance the air blowing operation.

(6) The ring member may have an elastic deformation promoting portion that promotes elastic deformation thereof in the direction to increase its radius, when the plurality of side portions of the tapered female engagement portion are engaged in close contact with the plurality of side portions of the tapered male engagement portion. According to this structure it is possible to promote elastic deformation of the tapered female engagement portion of the ring member, due to this elastic promotion portion.

(7) The elastic deformation promoting portion may include a plurality of circular arcuate grooves with their lower ends open that are shaped as circular arcs in plan view and are formed on a wall portion that surrounds the tapered female engagement portion. Since, according to this structure, this elastic deformation promoting portion includes the plurality of circular arcuate grooves that are formed on the wall portion of the tapered female engagement portion as circular arcs, in plan view, with their lower ends left open, accordingly the structure of the elastic deformation promoting portion becomes simple.

(8) The elastic deformation promoting portion may include a plurality of circular arcuate grooves with their upper ends open that are shaped as circular arcs in plan view and are formed on a wall portion that surrounds the tapered female engagement portion. Since, according to this structure, this elastic deformation promoting portion includes the plurality of circular arcuate grooves that are formed on the wall portion of the tapered female engagement portion as circular arcs, in plan view, with their upper ends left open, accordingly the structure of the elastic deformation promoting portion becomes simple.

(9) The elastic deformation promoting portion may include an annular groove with its lower end open that is formed on a wall portion that surrounds the tapered female engagement portion. Since, according to this structure, this elastic deformation promoting portion includes the annual groove formed on the wall portion of the tapered female engagement portion with its lower edge left open, accordingly the structure of the elastic deformation promoting portion becomes simple.

(10) There may further be included a plurality of slits on an annular wall more circumferentially internal than the annular groove, spaced at appropriate intervals in a circumferential direction and oriented in the radial direction. Since, according to this structure, the elastic deformation promoting portion includes this plurality of slits in the annular circumferential wall and more to the interior thereof than the annular groove, extending in the radial direction and spaced at appropriate intervals in the circumferential direction, accordingly elastic deformation becomes even simpler.

(11) The elastic deformation promoting portion may include an annular wall more circumferentially internal than the annular groove, and an annular groove that is formed flat in the vertical direction and adjacent to the annular groove. Since, according to this structure, the elastic deformation promoting portion includes this annular wall that is more towards the interior than the annular groove, and this annular groove that is formed flat in the vertical direction and in the vicinity of the annular groove and above it, accordingly elastic deformation becomes even simpler.

(12) The elastic deformation promoting portion may include a plurality of slits on a wall portion that surrounds the tapered female engagement portion, formed spaced at appropriate intervals in a circumferential direction and oriented in the radial direction. Since, according to this structure, the elastic deformation promoting portion includes the plurality of slits on a wall portion of the tapered female engagement portion, oriented in the radial direction and formed spaced at appropriate intervals in the circumferential direction, accordingly elastic deformation of the wall portion of the tapered female engagement portion in the circumferential direction becomes easier, and elastic deformation in the direction to increase the radius becomes easier.

(13) A plurality of positioning pins oriented vertically may be provided to the base member, and a plurality of pin holes into which those positioning pins are inserted may be provided in the ring member. Since, according to this structure, when engaging the ring member to the base member, due to the provision of the above described positioning pins and pin holes, it is possible to engage the tapered female engagement portion to the tapered male engagement portion in a state in which their phase angles around the vertical axis agree with one another, accordingly it is possible reliably to prevent damage to the tapered male engagement portion and the tapered female engagement portion.

(14) A plurality of positioning pins oriented vertically may be provided to the base member, and a plurality of pin holes or notched apertures into which those positioning pins are inserted may be provided in the work pallet. Since, according to this structure, due to the provision of the above described positioning pins and pin holes or notched apertures, it is possible to engage the tapered female engagement portion to the tapered male engagement portion in a state in which their phase angles around the vertical axis agree with one another, accordingly it is possible reliably to prevent damage to the tapered male engagement portion and the tapered female engagement portion.

(15) The regular polygon that is the horizontal cross section of the tapered male engagement portion may be a regular octagon that has eight circular arcuate vertex portions and eight side portions. Since, according to this structure, while the regular polygon which is the horizontal cross section of this tapered male engagement portion is a rectangular octagon that has eight circular arcuate vertex portions and eight side portions, still this octagonal shape is close to that of a circle, accordingly it becomes difficult for waste to take place with the wall portion of the tapered male engagement portion, so that there is an advantage from the point of view of making the structure more compact.

(16) The regular polygon that is the horizontal cross section of the tapered male engagement portion may be a regular hexagon that has six circular arcuate vertex portions and six side portions. Since, according to this structure, while the regular polygon which is the horizontal cross section of this tapered male engagement portion is a rectangular hexagon that has six circular arcuate vertex portions and six side portions, still this hexagonal shape is close to that of a circle, accordingly it becomes difficult for waste to take place with the wall portion of the tapered male engagement portion, so that there is an advantage from the point of view of making the structure more compact.

(17) The hydraulic cylinder may include a multi-layer coned disk springs for driving the ball lock mechanism. According to this structure, it is possible to contact the balls against the ball reception grooves and clamp them, due to the elastic force of this multi-layer coned disk springs.

(18) The hydraulic pressure cylinder may include a hydraulic pressure operation chamber to which hydraulic pressure is supplied for driving the ball lock mechanism to unclamp it. According to this structure, it is possible to cancel the clamping by shifting the balls into the ball reception holes by hydraulic pressure.

(19) The ball lock mechanism may include: a barrel portion formed on an upper end portion of the base member and inserted into a circular aperture in the ring member; a plurality of ball reception holes formed on the barrel portion; a plurality of balls each of which is held in one of the plurality of ball reception holes so as to be movable therein in the radial direction; a plurality of ball reception grooves that are formed on an internal circumferential portion of an upper end portion of the ring member so as to correspond to the plurality of ball reception holes; an annular piston member of the hydraulic cylinder; and a plurality of inclined portions for ball driving and a plurality of concave portions for ball retraction that are formed on an external circumferential portion of an annular piston rod of the annular piston member, so as to correspond to the plurality of ball reception holes. Since, according to this structure, this ball lock mechanism includes the plurality of ball reception grooves that are formed on the internal circumferential portion of the upper end portion of the ring member so as to correspond to the plurality of ball reception holes, and since the balls are contacted against the ball reception grooves in linear contact rather than in point contact, accordingly it becomes difficult for the balls to suffer damage, so that the durability is enhanced. Moreover, since this hydraulic cylinder is provided with the annular piston member, and since the plurality of ball drive portions and the plurality of ball retraction portions are provided on the external circumferential portion of the annular piston rod of this piston member and are formed so as to correspond to the plurality of ball reception holes, accordingly it is possible to provide a through hole in a portion in the neighborhood of the axis of the annular piston member.

(20) There may be further included a center barrel portion having a through hole in its center that is inserted into the piston portion of the annular piston member, and a bottom lid member that is formed integrally with the center barrel portion and is fixed to the base member so as to close a bottom portion of a hydraulic pressure operation chamber. According to this structure, it is possible to take advantage of this through hole for passing a hose or an electrical signal cable or the like, so that it is possible to employ the space in an effective manner.

(21) Each of the plurality of side portions in the horizontal cross section of the tapered male engagement portion may be formed as a circular arc that bulges slightly outward. According to this structure, when engaging the tapered male engagement portion and the tapered female engagement portion to one another in close contact, the contact areas of the side portions of the tapered male engagement portion and of the side portions of the tapered female engagement portion are increased, so that it is possible to center the ring member with high accuracy, and it is possible to enhance the degree of centering.

(22) Each of the plurality of side portions in the horizontal cross section of the tapered male engagement portion may be formed in a rectilinear shape. According to this structure, when engaging the tapered male engagement portion and the tapered female engagement portion to one another in close contact, it is possible to enhance the force for restraining rotation, due to the straight line shape of each one of these pluralities of side portions.

(23) Each of the plurality of side portions in the horizontal cross section of the tapered female engagement portion may include a concave relief portion formed at its central portion, and a pair of close engagement portions formed at the two ends of the concave relief portion. According to this structure, when engaging the tapered male engagement portion and the tapered female engagement portion to one another in close contact, it is possible to enhance the accuracy of positional determination in the horizontal direction and the force for restraining rotation, due to the fact that the number of spots at which close contact takes place becomes twice as great, due to the provision of the pairs of close fitting engagement portions. Furthermore it is possible to promote the elastic deformation in the direction to increase the radius, and to enhance the adherence, since the compressive stresses upon the pairs of close fitting engagement portions on the side portions are increased due to the provision of the concave relief portions. Yet further, it is possible to reduce the cost of the grinding process, since it is not necessary to grind the surfaces of the concave relief portions.

(24) Each of the plurality of side portions in the horizontal cross section of the tapered male engagement portion may include a concave relief portion formed at its central portion, and a pair of close fitting engagement portions formed at the two ends of this concave relief portion. According to this structure, when engaging the tapered male engagement portion and the tapered female engagement portion to one another in close contact, it is possible to enhance the accuracy of positional determination in the horizontal direction and the force for restraining rotation, due to the fact that the number of spots at which close contact takes place becomes twice as great, due to the provision of the pairs of close fitting engagement portions. Furthermore it is possible to promote the elastic deformation in the direction to increase the radius, and to enhance the adherence, since the compressive stresses upon the pairs of close fitting engagement portions on the side portions are increased due to the provision of the concave relief portions. Yet further, it is possible to reduce the cost of the grinding process, since it is not necessary to grind the surfaces of the concave relief portions.

Figure 1:
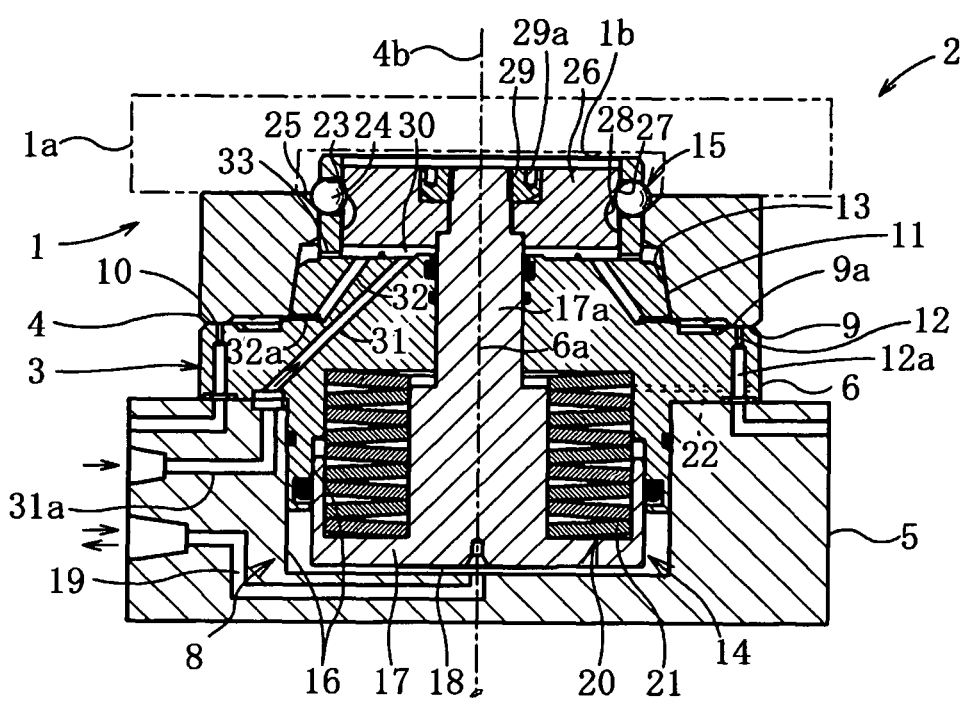
FIG. 1 is a sectional view of a positioning and fixing device according to Embodiment 1 of the present invention along the line I-I in FIG. 3.

DESCRIPTION OF NUMERALS 1, 1A~1D, 101, 151A~151F: work pallet
2, 2L, 102, 152A~152F: positioning and fixing device
4, 4A~4L, 4O, 4P, 4Z, 154A~154F: ring member
5: lower base member
6, 6A~6G, 6L, 106, 156A~156F: base member
8, 8A~8F, 108: clamp mechanism
9: lower end reference surface
10: Z reference surface
11, 11A~11E, 11~11N, 11Z, 111: tapered male engagement portion
11a, 11aA~11aE, 11aL: circular arcuate vertex portion
11b, 11bA~11bE, 11bL~11bN: side portion
13, 13L~13N, 113: tapered female engagement portion
13a, 13aL: circular arcuate vertex portion
13b, 13bL~13bN: side portion
14, 114, 164A~164E: hydraulic cylinder for clamping
15, 115, 165A~165C: ball lock mechanism
17: piston member
18: hydraulic pressure operation chamber
23: ball reception hole
24: ball
25: ball reception groove
26, 26A: circular plate member
27: inclined portion for ball driving
28: concave portion for ball retraction
35, 38: concave relief portion
36, 36A, 36B, 39, 39A, 39B: close engagement portion
50, 50A~50I: elastic deformation promoting portion
188: lock mechanism
190: collet mechanism
195: diaphragm mechanism

BEST MODE FOR IMPLEMENTING THE INVENTION

In the following, preferred modes for implementation of the present invention will be explained on the basis of embodiments.

Embodiment 1

First, a work pallet 1 will be explained.

Figure 2:
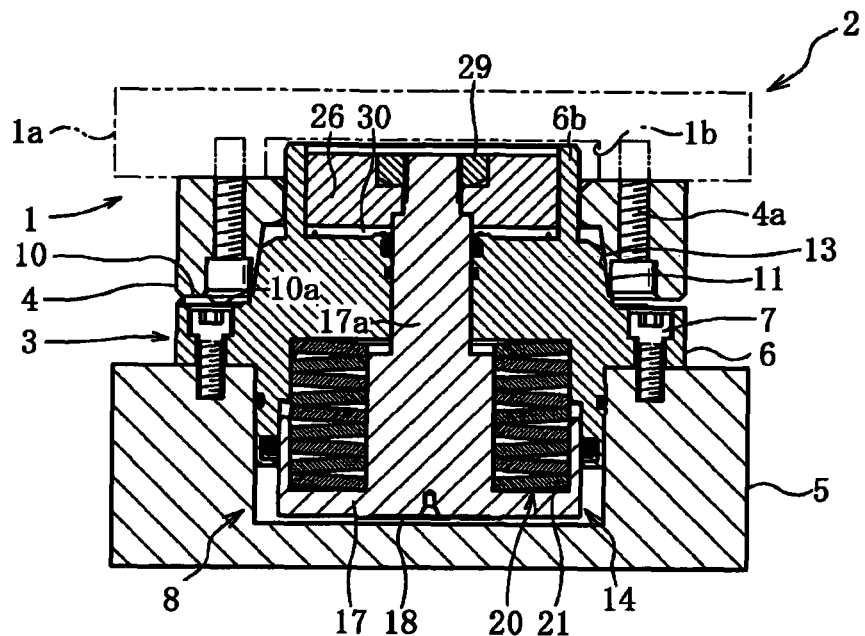
FIG. 2 is a sectional view of the positioning and fixing device along the line II-II in FIG. 3.
Figure 3:
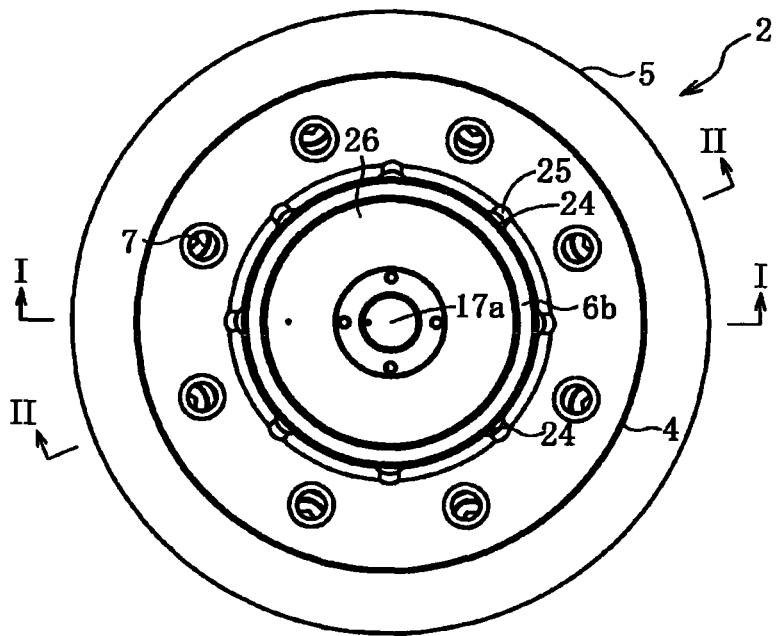
FIG. 3 is a plan view of the positioning and fixing device.

As shown in FIGS. 1 and 2, this work pallet 1 is a device for fixing a workpiece during machining processing by a machine tool such as a machining center or the like. The work pallet 1 is positionally determined and fixed upon a table of the machine tool (or upon a member that is equivalent to a table) by a work pallet positioning and fixing device 2 (hereinafter termed "positioning and fixing device 2") in the vertical direction and the horizontal direction; and also the rotation of the work pallet 1 with respect to the table about the vertical axis is restrained.

The work pallet 1 comprises a pallet main body 1a that consists of a square plate member made from steel as seen in plan view, and a ring member 4 that is fixed to the lower portion of the pallet main body 1a by a plurality of bolts 4a. The vertical axis 4b of the ring member 4 passes through the center of the pallet main body 1a, with the external diameter of the ring member 4 being around ⅔ to ⅘ of the width of the pallet main body 1a. A circular aperture 4c is formed in the ring member 4, and has a diameter around 0.5 to 0.6 times of the diameter thereof (refer to FIG. 5). A circular concave portion 1b whose diameter is somewhat larger than that of the circular aperture 4c is formed in the lower portion of the pallet main body 1a, in the neighborhood of the circular aperture 4c and above it. This circular concave portion 1b and the circular aperture 4c open downwards.

Next, the overall structure of the positioning and fixing device 2 will be explained on the basis of FIGS. 1 through 5.

The positioning and fixing device 2 comprises a base side unit 3 that is fixed to the table, and the ring member 4 that is fitted to the work pallet 1. The base side unit 3 comprises a lower base member 5, a base member 6 that is fixed to the lower base member 5 by a plurality of bolts 7, and a clamp mechanism 8 that fixes the ring member 4 so that it is attachable and detachable. The lower base member 5 is fixed to the table of a machine tool by a plurality of bolts. It should be understood that the lower base member 5 and the table may be formed integrally.

Next, the base member 6 will be explained.

As shown in FIGS. 1 through 4, the base member 6 comprises a vertical axis 6a, Z reference surfaces 10 that can stop the lower end reference surface 9 of the ring member 4 and thus position it in the vertical direction, a tapered male engagement portion 11 whose horizontal cross section is formed as a regular polygon having a plurality of outwardly convex circular arcuate vertex portions 11a and a plurality of side portions 11b that bulge slightly outwards, and that reduces in diameter upwards, and a barrel portion 6b that can be inserted into the circular aperture 4c of the ring member 4. This tapered male engagement portion 11 is formed integrally with the base member 6, and the desirable slope angle with respect to the vertical direction of the tapered male engagement portion 11 is 7°~12°. The horizontal cross section of the tapered male engagement portion 11 is formed as a regular octagon, having eight circular arcuate vertex portions 11a that are convex outward and eight side portions 11b that bulge slightly outwards. The eight side portions 11b are smoothly curved towards the outside in circular arcs of very small curvature. And the tapered male engagement portion 11 is positioned more towards the inside than a conical surface that joins eight balls 24 of a ball lock mechanism 15 and the Z reference surfaces 10 in the radial direction.

The base member 6 is fixed to the lower base member 5 by the plurality of bolts 7. As seen in plan view, on a portion of the upper surface of the base member 6 that is more towards the outside than the tapered male engagement portion 11, the Z reference surfaces 10 are formed by circular arcs whose opening angles are 45°. These Z-reference surface 10 are formed at regular intervals around the circumferential direction in four places, so as to correspond to side portions 11b of the tapered male engagement portion 11. A shallow annular concave groove 10a is formed more to the inside than the Z reference surfaces 10. Seating checking nozzles 12 through which pressurized air is injected are formed in a pair of the Z reference surfaces 10 that oppose one another across the axis 6a. Air passages 12a are formed in the base member 6 and the lower base member 5, and supply pressurized air to these seating checking nozzles 12. These air passages 12a are connected to a pressurized air supply source and a pressure switch, change of the air pressure in the air passages 12a is detected by a pressure switch, and the fact that the lower end reference surface 9 of the ring member 4 has is seated upon the Z-reference surfaces 10 may be confirmed from this change of air pressure.

Next, the ring member 4 will be explained.

As shown in FIGS. 1 through 3 and 5, the ring member 4 has a vertical axis 4b, an annular lower end reference surface 9, and a tapered female engagement portion 13 that is capable of engaging from above with the tapered male engagement portion 11, so that this lower end reference surface 9 comes to be in the state of contacting against the Z reference surfaces of the base member 6, and moreover whose horizontal cross section is formed as a regular polygon having a plurality of circular arcuate vertex portions 13a that are convex outward, and a plurality of side portions 13b. This tapered female engagement portion 13 engages in close contact to the tapered male engagement portion 11, via elastic deformation of the external circumferential side wall portion of the tapered female engagement portion 13 in the direction to increase its radius. This tapered female engagement portion 13 is formed integrally with the ring member 4. The horizontal cross section of this tapered female engagement portion 13 is formed as a regular octagon, having eight circular arcuate vertex portions 13a that are convex outward and eight side portions 13b that bulge slightly outwards. This tapered female engagement portion 13 reduces in diameter upwards (refer to FIG. 5). The eight side portions 13b are smoothly curved towards the outside in circular arcs of very small curvature. The ring member 4 is fixed to the pallet main body 1a by the plurality of bolts 4a. And a shallow annular concave portion 9a is formed on the lower surface of the ring member 4, on the inside of the annular lower end reference surface 9. It should be understood that a structure would be acceptable in which, when the tapered male engagement portion 11 is engaged in close contact with the tapered female engagement portion 13, the circular arcuate vertex portions 11a are engaged to the circular arcuate vertex portions 13a with slight gaps between them; and a structure would also be acceptable in which they are engaged in close contact.

Next, the clamp mechanism 8 will be explained.

As shown in FIGS. 1 and 2, the clamp mechanism 8 is a system for fixing the work pallet 1 to the base member 6 via the ring member 4. This clamp mechanism 8 comprises a hydraulic cylinder for clamping 14 and a ball lock mechanism 15 that is provided to the ring member 4. The hydraulic cylinder 14 for clamping comprises a cylinder bore 16 that is formed in the lower base member 5 and the base member 6, a piston member 17 that is installed in this cylinder bore 16 so as to be movable in the vertical direction, a hydraulic pressure operation chamber 18 for clamping release, a hydraulic pressure supply conduit 19 that is connected to an external hydraulic pressure supply source, an annular spring receiving chamber 20 that is formed in the base member 6, and a multi-layer coned disk springs 21 that is fitted into this spring receiving chamber 20 in the compressed state. An air passage 22 is formed in the base member 6, and is connected to the spring receiving chamber 20 for ventilating it.

Next, the ball lock mechanism 15 will be explained.

Figure 4:
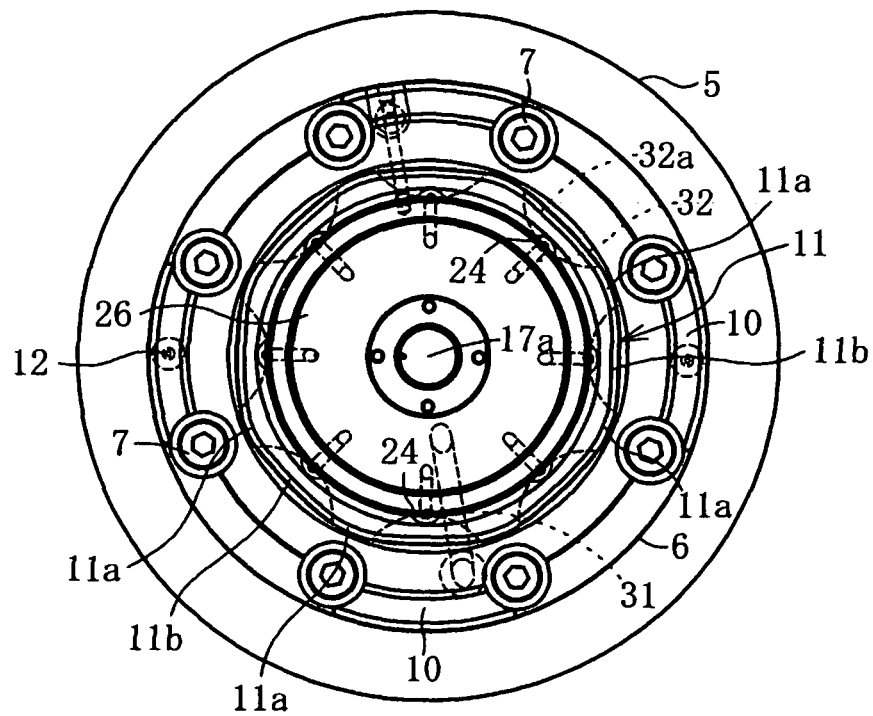
FIG. 4 is a plan view of a base unit.
Figure 5:
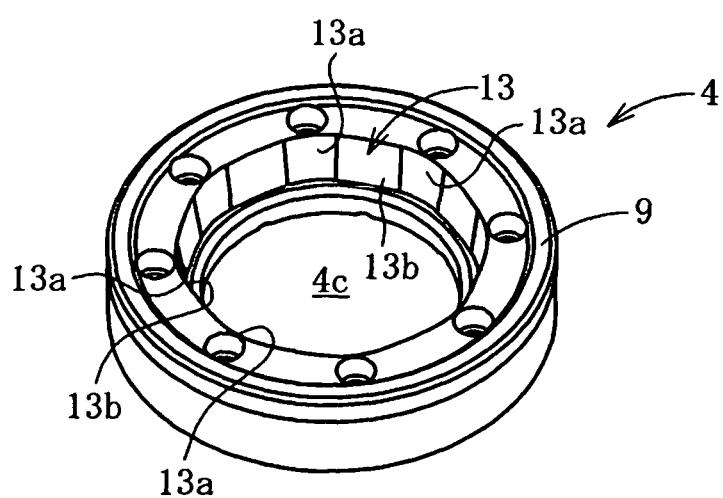
FIG. 5 is a perspective view of the rear surface of a ring member.

As shown in FIGS. 1, 4, and 5, the ball lock mechanism 15 comprises eight ball reception holes 23 formed in the barrel portion 6b of the base member 6, eight balls 24 (steel balls) that are fitted into these ball reception holes 23 so as to be movable in the radial direction, eight ball reception grooves 25 that are formed on the internal circumferential side of the upper end portion of the ring member 4 so as to correspond to the eight ball reception holes 23, a circular plate member 26 that is provided at the upper end portion of the piston rod 17a of the piston member 17 and moreover fits into the barrel portion 6b so as to slide freely in the vertical direction therein, eight inclined portions 27 for ball driving that are formed on the external circumferential portion of this circular plate member 26 so as to correspond to the eight ball reception holes 23, and eight concave portions 28 for ball retraction. These eight ball reception holes 23 and eight balls 24 are positioned so as to correspond to the central portions of the eight side portions 11b of the tapered male engagement portion 11.

The ball reception grooves 25 are formed as partially cylindrical grooves, and are inclined so as to be able to receive the lower end portions of the balls 24. The circular plate member 26 is fixed on the upper end portion of the piston rod 17a by a nut member 29, in a state so that the eight inclined portions 27 for ball driving and concave portions 28 for ball retraction correspond to the eight ball reception holes 23. The nut member 29 has a plurality of apertures 29a for engagement of a tool.

In the state in which hydraulic pressure is being supplied to the hydraulic pressure operation chamber 18 and the piston member 1 is being held in its elevated position, so that the eight balls 24 are partially retracted into the eight concave portions 28 for ball retraction, the work pallet 1 is engaged onto the base member 6 from above. Next, when the hydraulic pressure in the hydraulic pressure operation chamber 18 is changed over to drain pressure, the piston member 17 is driven downwards by the elastic force of the multi-layer coned disk springs 21. Since, during this downwards driving, as shown in FIG. 1, the eight balls 24 are driven outwards in the radial direction by the eight inclined portions 27 for ball driving, and are engaged into the eight ball reception grooves 25 and press those ball reception grooves 25 downwards, accordingly the ring member 4 is clamped to the base side unit 3 by the clamp mechanism 8. And when, for clamp release, hydraulic pressure is supplied to the hydraulic pressure operation chamber 18, then the piston member 17 is raised, and the eight balls 24 are partially retracted into the eight concave portions 28 for ball retraction, so that the clamp is released.

Next, an air blow mechanism will be explained.

As shown in FIGS. 1 and 4, an annular air chamber 30 is formed between the base member 6 and the circular plate member 26, and an air supply conduit 31 is formed to supply pressurized air to this air chamber 30. The air supply conduit 31 is connected to a pressurized air supply source via an air passage 31a formed in the lower base member 5, thereby pressurized air may be supplied to this air chamber 30.

In order to blow away foreign matter such as cutting swarf and so on between the lower end reference surface 9 and the Z reference surfaces 10, and between the lower end reference surface 9 and the base member 6, there are formed eight air passages 32 to which pressurized air is supplied from the air chamber 30, and slit shaped horizontal air nozzles 32a each of which leads to one of these air passages 32. These horizontal air nozzles 32a are formed as circular portions of small aperture, so as to blow air against the entire area of the Z reference surfaces 10.

In order to blow air between the tapered male engagement portion 11 and the tapered female engagement portion 13, eight air nozzles 33 are formed in the lower end portion of the barrel portion 6b, and are connected to the air chamber 30. When the ring member 4 is engaged to the base member 6 while pressurized air is being ejected from these air nozzles 33, air is blown with strong force into the narrow gap between the tapered male engagement portion 11 and the tapered female engagement portion 13, and thereby foreign matter such as cutting swarf and so on is eliminated.

Next, the operation and the advantages of this work pallet positioning and fixing device 2 will be explained.

When the work pallet 1 with the workpiece fixed thereto is to be positioned and fixed to the table of the machine tool, the ring member 4 is engaged to the base member 6 in the state with hydraulic pressure supplied to the hydraulic pressure operation chamber 18 of the clamp mechanism 8. At this time, this is done while supplying pressurized air to the air chamber 30.

At this time, a state is established in which the engagement ring member 4 and the base member 6 are engaged together in a state with their rotational phases around their axis having been brought into agreement, the tapered female engagement portion 13 is brought into light contact against the tapered male engagement portion 11, and the lower end reference surface 9 of the ring member 4 is brought into light contact against the eight Z reference surfaces 10. Next, when the hydraulic pressure in the hydraulic pressure operation chamber 18 is changed over to drain pressure, as previously described, the clamp state is established in which the ring member 4 is clamped to the base side unit 3. At this time, the tapered female engagement portion 13 comes into a state of close contact with the tapered male engagement portion 11 via elastic deformation of the external circumferential side wall portion of this tapered female engagement portion 13, and the lower end reference surface 9 comes into a state of close contact with the Z-reference surfaces 10.

Due to the intimate contact of the lower end reference surface 9 against the Z reference surfaces 10, it is possible to position the work pallet 1 in the vertical direction (the Z direction) with high accuracy. And, due to the intimate contact of the tapered female engagement portion 13 against the tapered male engagement portion 11, it is possible to position the work pallet 1 in the horizontal direction with high accuracy. Furthermore, it is possible to positionally determine the rotational phase of the work pallet 1 about the vertical axis with respect to the base member 6 with high accuracy, and it is possible to restrain the work pallet 1 with respect to the base member 6 so that it does not rotate around that axis. In this manner it is possible to obtain two-direction restraint, without delicate adjustment of the position in the height direction of the lower end reference surface 9 or of the Z reference surfaces 10, and also without employing any movable member either in the tapered male engagement portion 11 or in the tapered female engagement portion 13.

Since the ring member 4 is fixed to the work pallet 1, and the tapered female engagement portion 13 is formed integrally with this ring member 4, accordingly it is possible to reduce the manufacturing cost of this work pallet 1 to lower than if the tapered female engagement portion were to be formed directly upon the work pallet 1. Since the horizontal cross sections of the tapered male engagement portion 11 and of the tapered female engagement portion 13 have the eight circular arcuate vertex portions 11a, 13a and the eight side portions 11b, 13b, and since, while this shape is a non-circular regular polygon, it is quite close to that of a circle, accordingly waste in the wall portion of the tapered male engagement portion 11 and the tapered female engagement portion 13 and waste of space are kept very low, and this is advantageous from the point of view of making the device more compact, and also from the point of view of manufacturing cost.

Since each of the eight side portions 11b of the tapered male engagement portion 11 is formed as a circular arc shape that bulges slightly to the outside, while each of the eight side portions 13b of the tapered female engagement portion 13 is also formed as a circular arc shape which bulges slightly to the outside, accordingly, when the tapered male engagement portion 11 and the tapered female engagement portion 13 are engaged together in close mutual contact, the contact areas between their side portions 11b and their side portions 13b increase, and thus it is possible to center the ring member 4 with high accuracy, and it is possible to enhance the degree of centering.

Since the tapered male engagement portion 11 is positioned more inwards than the conical surface that contains the plurality of balls 24 and the Z reference surfaces 10, accordingly, when the ring member 4 is engaged and clamped to the base member 6, a force that presses inwards acts upon the eight side portions 13b of the tapered female engagement portion 13. Due to this, elastic deformation of the exterior side wall portions of the eight side portions 13b of the tapered female engagement portion 13 to increase the radius of the circumferential side wall portion is promoted, and it is possible to engage the eight side portions 13b in close contact to the eight side portions 11b.

Since the eight ball reception holes 23 and the eight balls 24 are positioned so as to correspond to the central portions of the eight side portions 11b of the tapered male engagement portion 11, accordingly, when clamped by the ball lock mechanism 8, the eight side portions 13b of the tapered female engagement portion 13 are reliably pressed against the eight side portions 11b of the tapered male engagement portion 11. Due to this, it is possible closely to engage the tapered female engagement portion 13 to the tapered male engagement portion 11.

Since pressurized air is supplied to the air chamber 30 when the ring member 4 is engaged to the base member 6 and clamped with the clamp mechanism 8, accordingly no foreign matter such as swarf or the like can get in between them and cause an obstruction. In a similar manner, since pressurized air is ejected from the eight air nozzles 33 and is blown against the tapered male engagement portion 11 and the tapered female engagement portion 13, accordingly no foreign matter such as swarf or the like can get in between them and cause an obstruction. And the air blowing operation is enhanced, because the air is blown in from the horizontal air nozzles 32a over wide angles against the entire areas of the Z reference surfaces 10.

When the clamping by the clamp mechanism is to be released, as previously described, hydraulic pressure is supplied to the hydraulic pressure operation chamber 18, and, along with this making it possible for the eight balls 24 to retract into the concave portions 28 for ball retraction, also the upper end of the piston rod 17a is projected upwards and is contacted against the upper end wall surface of the circular concave portion 1b of the work pallet 1. When this is done, the engagement between the tapered female engagement portion 13 and the tapered male engagement portion 11 is separated, it is possible to release the clamping. Since, during the clamped state, the balls 24 are stopped by the ball reception grooves 25 in a circular arcuate contact state, and moreover are engaged into these eight ball reception grooves 25, accordingly it is possible for the work pallet 1 to be restrained by these as well, so that it does not rotate around its axis relative to the base member 6.

Moreover, since the circular plate member 26 is provided at the upper end portion of the piston rod 17a of the clamp mechanism 8, and the eight inclined portions 27 for ball driving and concave portions 28 for ball retraction are formed on the external circumferential portion of this circular plate member 26, accordingly it is possible to reduce the diameter of the greater portion of the piston rod 17a, and it is possible to make the hydraulic cylinder 14 more compact and lighter. And it is possible to simplify the structure of the air supply conduits for blowing air, since the air chamber 30 is formed by effective utilization of this circular plate member 26.

While, in the following, various embodiments that are partial variations of the work pallet positioning and fixing device 2 described above and embodiments that are partial variations of these embodiments will be explained, the same reference numerals will be appended to structural elements that are the same as ones of preceding embodiments, and explanation thereof will be curtailed, with only structural elements that are different being explained.

Embodiment 2

Figure 6:
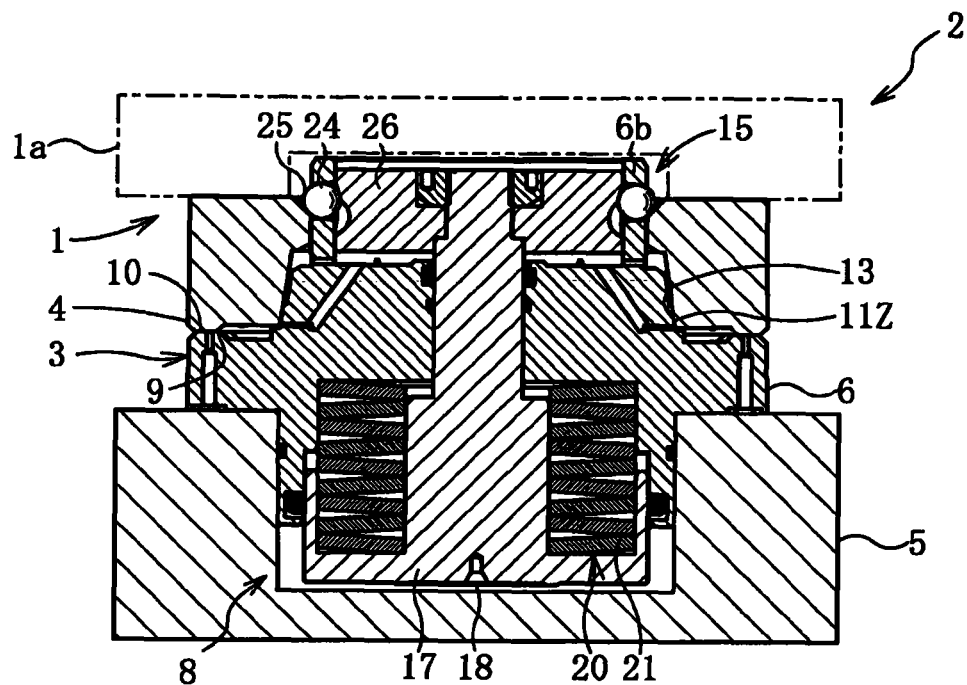
FIG. 6 is a sectional view of a positioning and fixing device according to Embodiment 2.

As shown in FIG. 6, a tapered male engagement portion 11Z is one whose length in the axial direction is small, and this tapered male engagement portion 11Z is formed to correspond to the lower end portion of the ring member 4. The other structural details, the operation, and the advantages are same as Embodiment 1.

Embodiment 3

Figure 7:
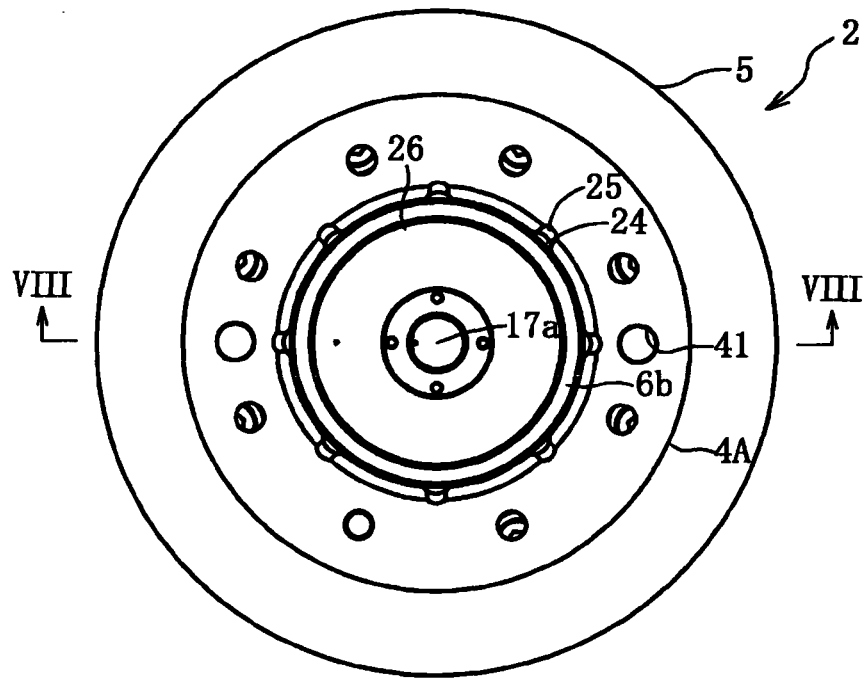
FIG. 7 is a sectional view of a positioning and fixing device according to Embodiment 3.
Figure 8:
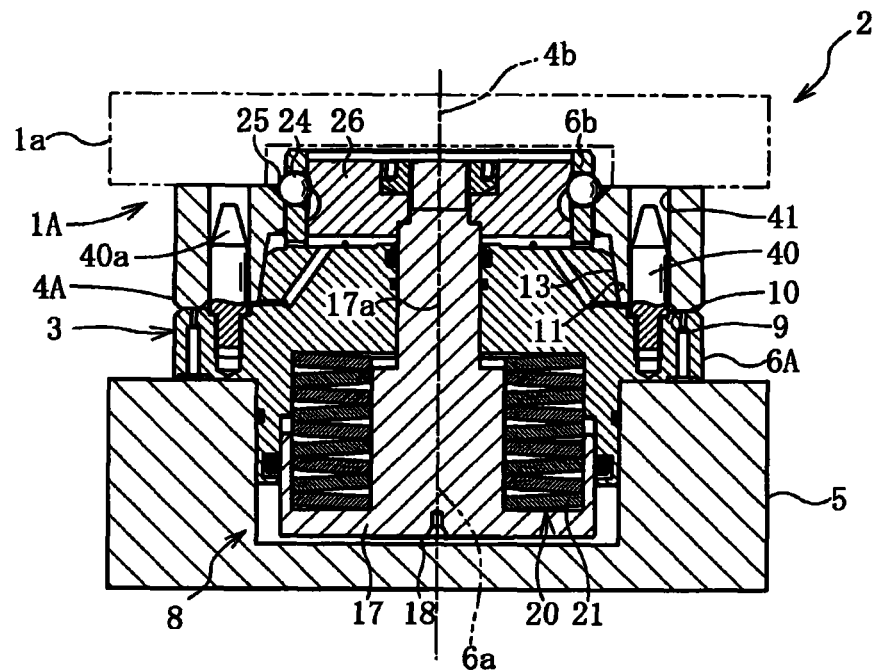
FIG. 8 is a sectional view along the line VIII-VIII of FIG. 7.

As shown in FIGS. 7 and 8, a pair of vertical positioning pins 40 are fixed to the base member 6A, positioned symmetrically with respect to the axis 6a. And a pair of pin apertures 41 are formed in the ring member 4A, with the positioning pins 40 inserted into them. Conical taper portions 40a are formed at the upper end portions of the positioning pins 40. The rotational phase of the work pallet 1A with respect to the base member 6A is appropriately determined by these positioning pins 40 being fitted into the pin apertures 41.

Due to this, when engaging the tapered female engagement portion 13 with the tapered male engagement portion 11, it is possible to match the rotational phase to the state in which the plurality of circular arcuate vertex portions 13a of the tapered female engagement portion 13 agree with the plurality of circular arcuate vertex portions of the tapered male engagement portion 11. Moreover, since the tapered female engagement portion 13 cannot engage with the tapered male engagement portion 11 in the state in which the rotational phase is not matched, accordingly it is possible to prevent damage to the tapered female engagement portion 13 or the tapered male engagement portion 11 caused by them being engaged together while their rotational phase still does not match. The other structural details, the operation, and the advantages are same as in Embodiment 1.

Embodiment 4

Figure 9:
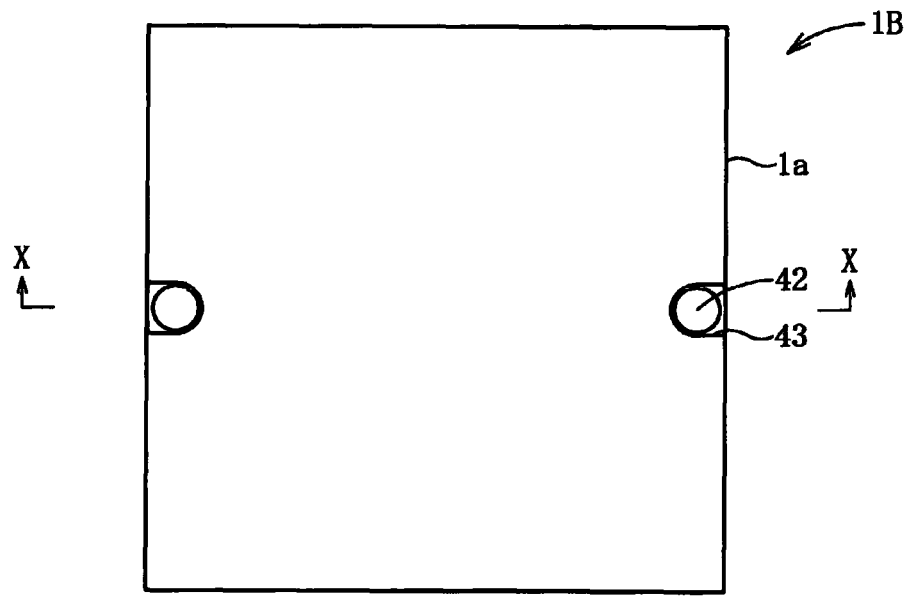
FIG. 9 is a plan view of a positioning and fixing device and a work pallet according to Embodiment 4.
Figure 10:
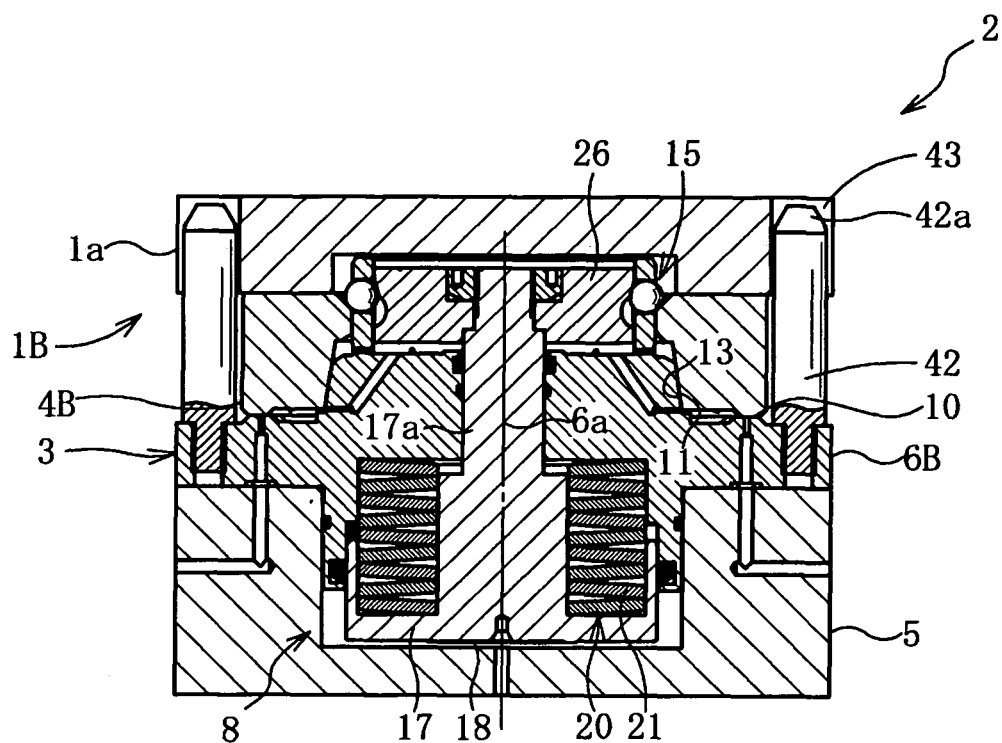
FIG. 10 is a sectional view along the line X-X of FIG. 9.

As shown in FIGS. 9 and 10, with the same objective as that of Embodiment 3, a pair of vertical positioning pins 42 are fixed to the base member 6b symmetrically with respect to the axis 6a. The ring member 4B is formed to have a smaller diameter than the distance between this pair of positioning pins 42. A pair of notched apertures 43 into which the pair of positioning pins 42 engage are formed in the work pallet 1B. Taper portions 42a are formed at the upper ends of the positioning pins 42. Since the notched apertures 43 are pierced through as far as the upper end of the work pallet 1B, they are advantageous from the point of view of position matching the pair of notched apertures 43 to the pair of positioning pins 42. It should be understood that, instead of the notched apertures 43, it would also be acceptable to arrange to form pin apertures. The other structural details, the operation, and the advantages are same as in Embodiment 1.

Embodiment 5

Figure 11:
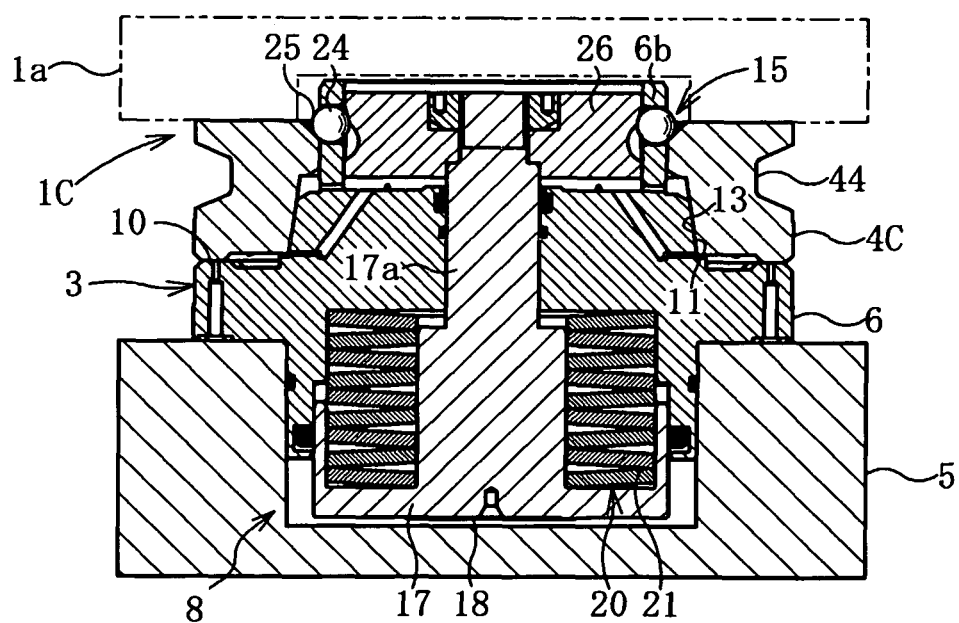
FIG. 11 is a sectional view of a positioning and fixing device according to Embodiment 5.

As shown in FIG. 11, a grasping groove 44 of trapezoidal cross sectional shape is formed in the external circumferential portion of the ring member 4C, in order for the work pallet 1C to be grasped by an ATC (automatic tool exchange device). The other structural details, the operation, and the advantages are same as in Embodiment 1.

Embodiment 6

Figure 12:
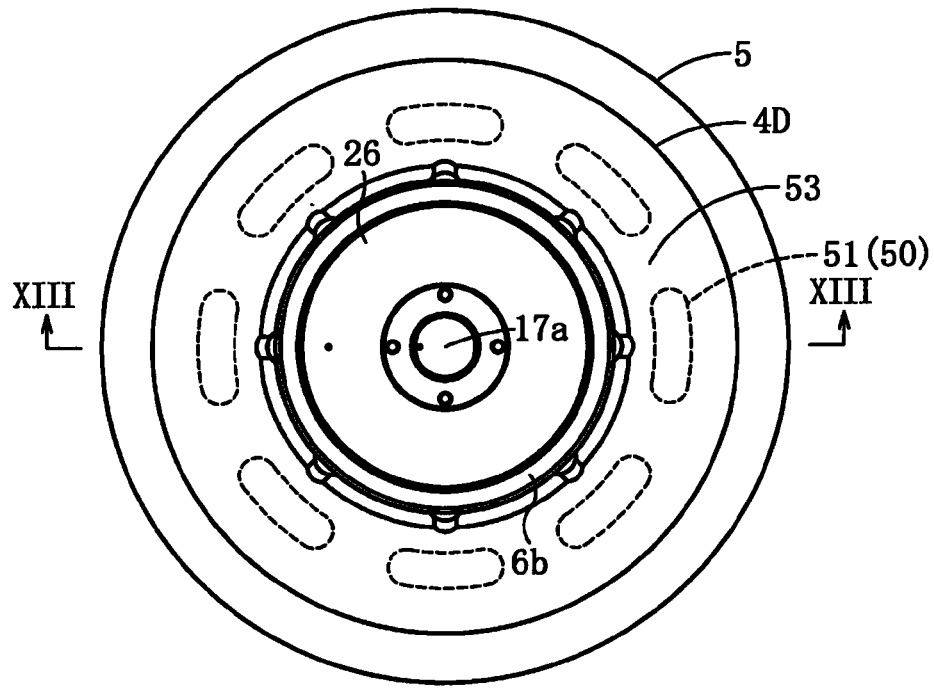
FIG. 12 is a sectional view of a positioning and fixing device according to Embodiment 6.
Figure 13:
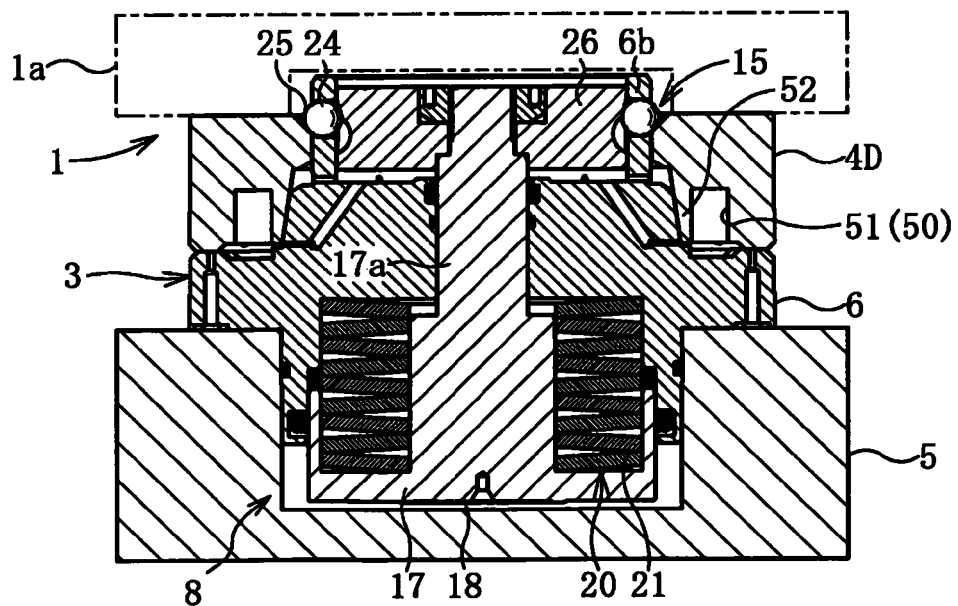
FIG. 13 is a sectional view along the line XIII-XIII of FIG. 12.

As shown in FIGS. 12 and 13, the ring member 4D has an elastic deformation promoting portion 50 that promotes elastic deformation of the external circumferential side wall portion of the tapered female engagement portion 13 in the direction to increase its diameter, when the tapered female engagement portion 13 is engaged in close contact to the tapered male engagement portion 11. This elastic deformation promoting portion 50 has eight circular arcuate grooves 51, which are formed in a wall portion that surrounds the tapered female engagement portion 13, and are shaped as circular arcs as seen in plan view, with their lower sides open. A rib wall 53 is formed between each of these circular arcuate grooves 51 and the ones adjacent to it, with the lengths of these rib walls 53 in the circumferential direction being about half of the lengths in the circumferential direction of the circular arcuate grooves 51, and an annular wall 52 having a certain rigidity is formed somewhat to the inward of these eight circular arcuate grooves 51.

When this tapered female engagement portion 13 is engaged in close contact with the tapered male engagement portion 11, they are engaged in close contact via elastic deformation of the eight rib walls 53 and the annular wall 52 in the direction to increase the radius, and thereby positioning in the horizontal direction with good accuracy becomes possible. It should be understood that the rib walls 53 are formed in positions in the circumferential direction that correspond to the circular arcuate vertex portions of the regular octagon of the horizontal cross sectional shape. The number of these circular arcuate grooves 51 is not limited to being eight; it could be less than eight, or nine or more.

Since the elastic deformation promoting portion 50 is provided in this manner, accordingly, when the tapered female engagement portion 13 is engaged in close contact with the tapered male engagement portion 11, it is possible to promote elastic deformation of the wall portion that surrounds the tapered female engagement portion 13 in the direction to increase its radius. Moreover the freedom in design is excellent, since it is possible to set the rigidity and the elastic deformability of the eight rib walls 53 and the ring shaped wall 52 appropriately by setting the ratio of the total length of the plurality of rib walls 53 to the total circumference in an appropriate manner. The other structural details, the operation, and the advantages are same as in Embodiment 1.

Embodiment 7

Figure 14:
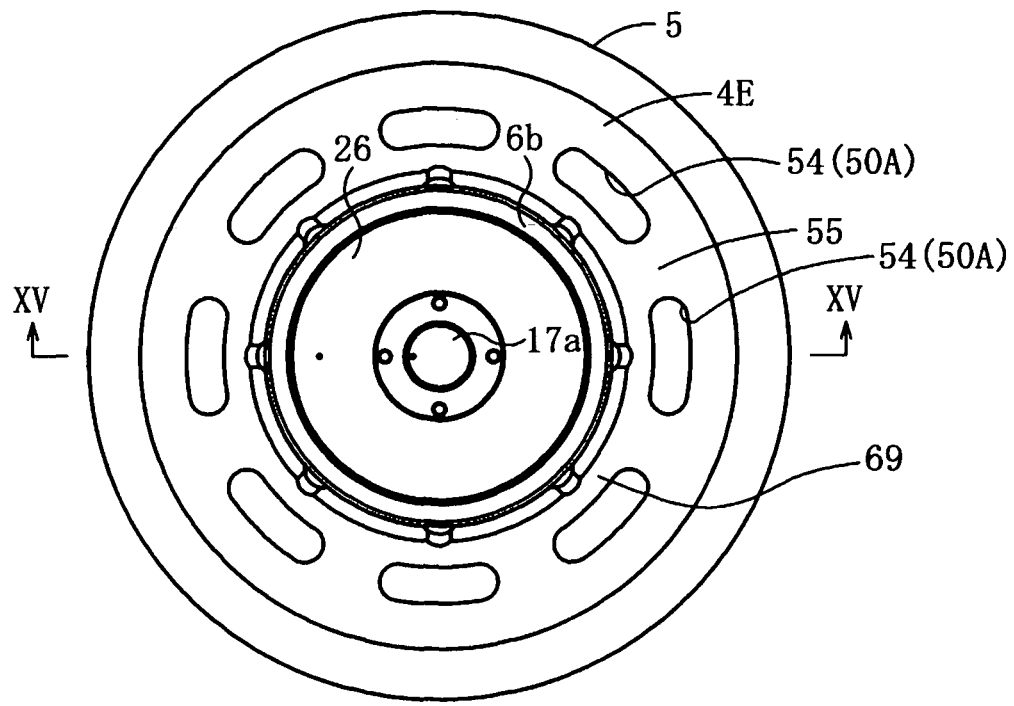
FIG. 14 is a plan view of a positioning and fixing device according to Embodiment 7.
Figure 15:
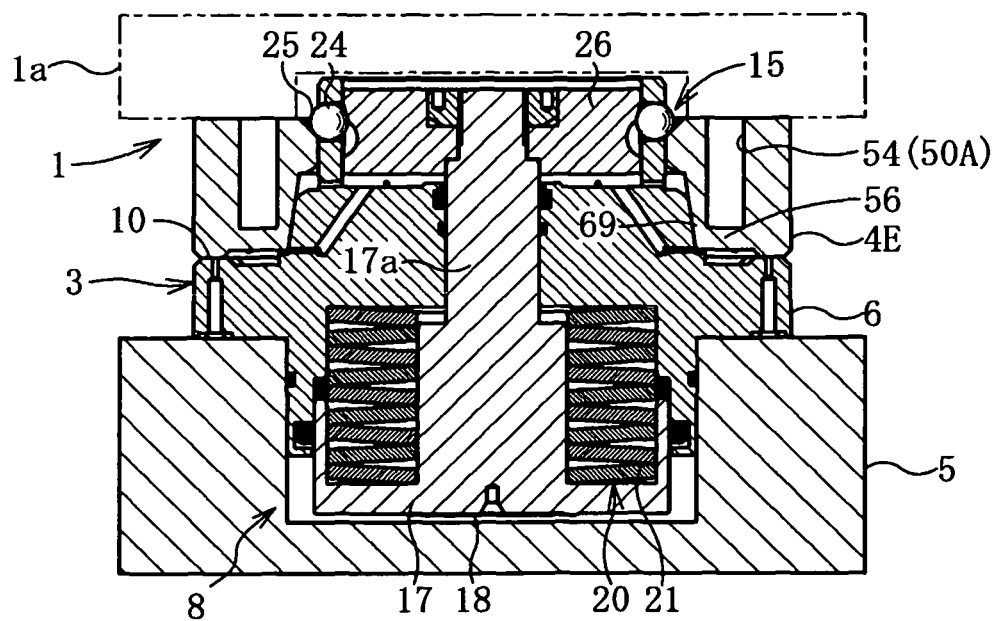
FIG. 15 is a sectional view along the line XV-XV of FIG. 14.

As shown in FIGS. 14 and 15, the ring member 4E has an elastic deformation promoting portion 50A that promotes elastic deformation of the external circumferential side wall portion of the tapered female engagement portion 13, when the tapered female engagement portion 13 is engaged in close contact to the tapered male engagement portion 11. This elastic deformation promoting portion 50A has eight circular arcuate grooves 54, which are formed in a wall portion that surrounds the tapered female engagement portion 13, and are shaped as circular arcs as seen in plan view, with their upper sides open. A rib wall 55 is formed between each of these circular arcuate grooves 54 and the ones adjacent to it, with the lengths of these rib walls 55 in the circumferential direction being about half of the lengths in the circumferential direction of the circular arcuate grooves 54. And an annular wall 69 having a certain rigidity is formed somewhat to the inward of these eight circular arcuate grooves 54. Lower walls 56 are formed below the eight circular arcuate grooves 54, and have thickness approximately the same as that of the annular wall 69. The other structural details, the operation, and the advantages are same as in Embodiment 6.

Next certain variants of the elastic deformation promoting portion 50, 50A will be explained in FIGS. 16 through 23; while only the ring member 4 is shown in these FIGS. 16 through 23, the explanation will be framed in terms of the upper side thereof being its side facing towards the work pallet 1 and its lower side being its side facing towards the base member 6.

Embodiment 8

Figure 16:
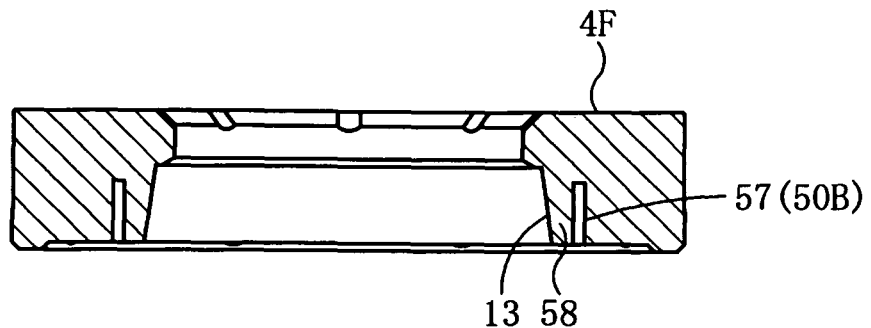
FIG. 16 is a sectional view of a first variant embodiment of the ring member according to Embodiment 8.

With a first example 4F shown in FIG. 16 of the ring member, there is provided an elastic deformation promoting portion 50B that promotes elastic deformation of the external circumferential side wall portion of the tapered female engagement portion 13, when the tapered female engagement portion 13 is engaged in close contact to the tapered male engagement portion 11. This elastic deformation promoting portion 50B has an annular groove 57 whose lower edge is left open, formed in the wall portion that surrounds the tapered female engagement portion 13. The cross sectional shape of this annular groove 57 is a rectangle whose width in the radial direction is small. And an annular wall 58 is formed between the tapered female engagement portion 13 and the annular groove 57, and can be elastically deformed in the direction to increase its radius and moreover has a certain degree of rigidity. The freedom of design is excellent, because it is possible to set the rigidity and the elastic deformability of this annular wall 58 appropriately by setting the thickness in the radial direction of this annular wall 58 in an appropriate manner.

Figure 17:
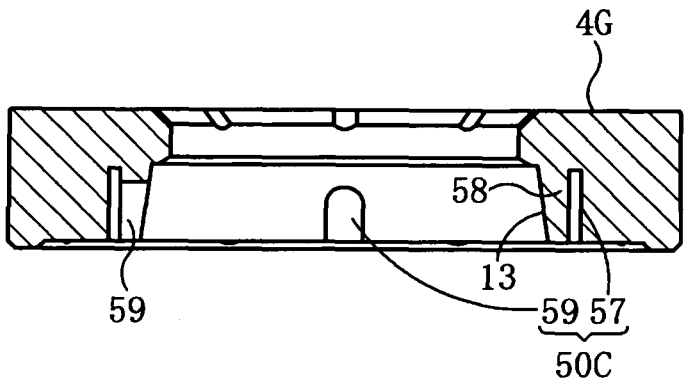
FIG. 17 is a sectional view of a second variant embodiment of the ring member.

And, as shown in FIG. 17, the elastic deformation promoting portion shown in FIG. 16 is made as an elastic deformation promoting portion 50C that is partially changed, so that in this second example 4G of the ring member, in addition to the annular groove 57, a plurality of notch portions 59 (for example, two or four) are formed in the annular wall 58.

Figure 18:
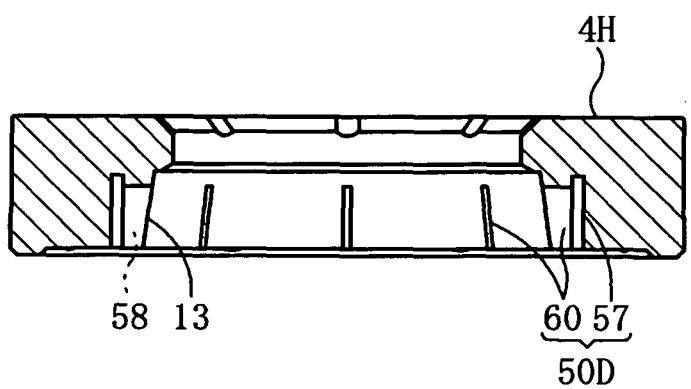
FIG. 18 is a sectional view of a third variant embodiment of the ring member.

And, as shown in FIG. 18, in a third example 4H of the ring member, the elastic deformation promoting portion shown in FIG. 16 is made as an elastic deformation promoting portion 50C that is partially changed, so that, in addition to the annular groove 57, a plurality of slits 60 (for example, eight) are formed in the annular wall 58.

Figure 19:
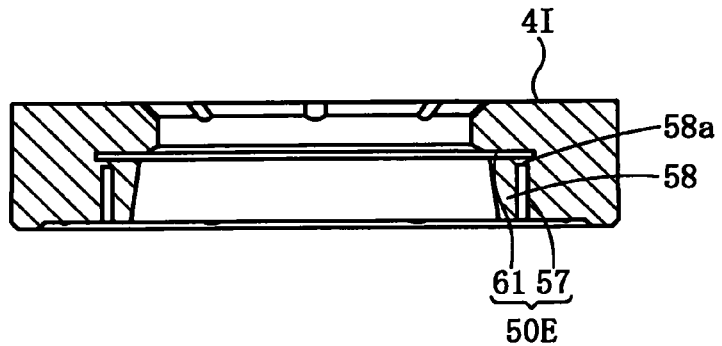
FIG. 19 is a sectional view of a fourth variant embodiment of the ring member.

As shown in FIG. 19, in a fourth example 4I of the ring member, as an elastic deformation promoting portion 50E in which the elastic deformation promoting portion shown in FIG. 16 has been partially changed, in addition to the annular groove 57, an annular wall 58 and an annular groove 61 that is formed above and adjacent to the annular groove 57 in a direction perpendicular to the vertical direction are formed circumferentially inward to this annular groove 57. Since a thin annular linking wall 58a is thus defined by the upper wall portion of the annular groove 57, accordingly it becomes easier for the annular wall 58 and the link wall 58a to be elastically deformed in the direction to increase the radius.

Figure 20:
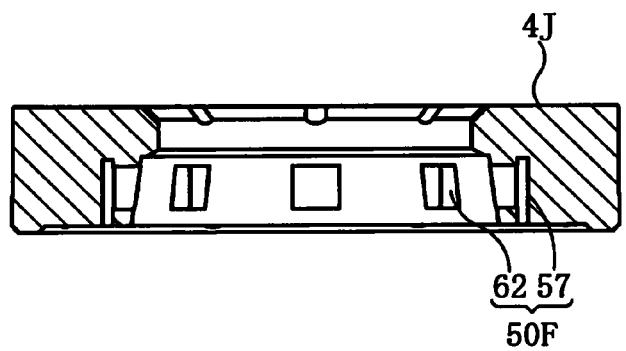
FIG. 20 is a sectional view of a fifth variant embodiment of the ring member.

As shown in FIG. 20, in a fifth example 4J of the ring member, as an elastic deformation promoting portion 50F in which the elastic deformation promoting portion shown in FIG. 16 has been partially changed, in addition to the annular groove 57, a plurality of rectangular apertures 62 (for example, eight thereof) are formed in the annular wall 58, on the circumferentially interior side of the annular groove 57.

Figure 21:
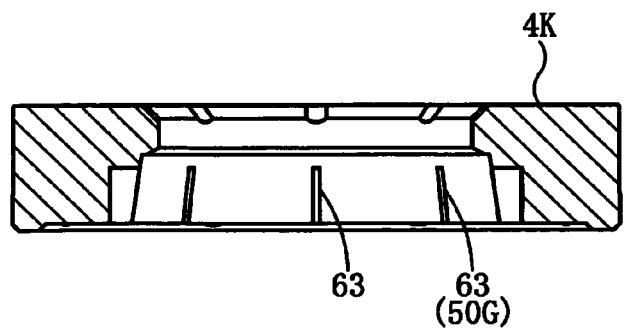
FIG. 21 is a sectional view of a sixth variant embodiment of the ring member.

A sixth example 4K shown in FIG. 21 of the ring member has an elastic deformation promoting portion 50G that promotes elastic deformation of the external circumferential side wall portion of the tapered female engagement portion 13, when the tapered female engagement portion 13 is engaged in close contact with the tapered male engagement portion 11. This elastic deformation promoting portion 50G has a plurality of slits 63 (for example, eight thereof) that are oriented in the radial direction and that are formed on the wall portion that surrounds the tapered female engagement portion 13 with appropriate intervals between them in the circumferential direction.

Figure 22:
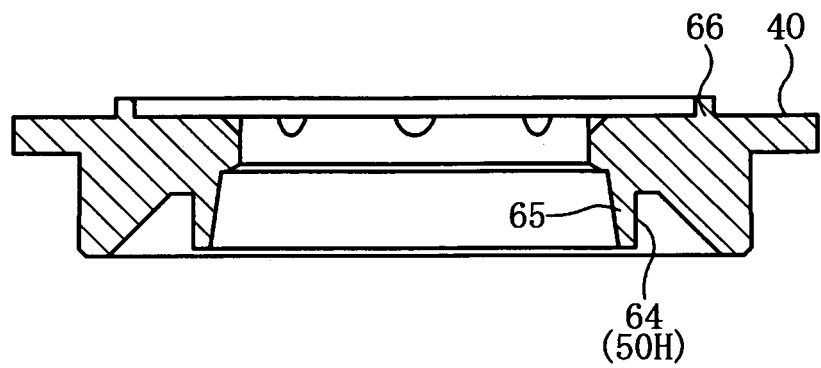
FIG. 22 is a sectional view of a seventh variant embodiment of the ring member.

As shown in FIG. 22, in a seventh example 4O of the ring member, as an elastic deformation promoting portion 50H in which the elastic deformation promoting portion shown in FIG. 16 has been partially changed, an annular groove having a triangular cross-sectional shape is formed. An annular wall 65 is formed on the inner side of this annular groove 64. It should be understood that a fitting barrel portion 66 for being fitted into a concave large diameter circular portion on the work pallet is formed on the upper surface portion of this ring member 4O so as to project therefrom.

Figure 23:
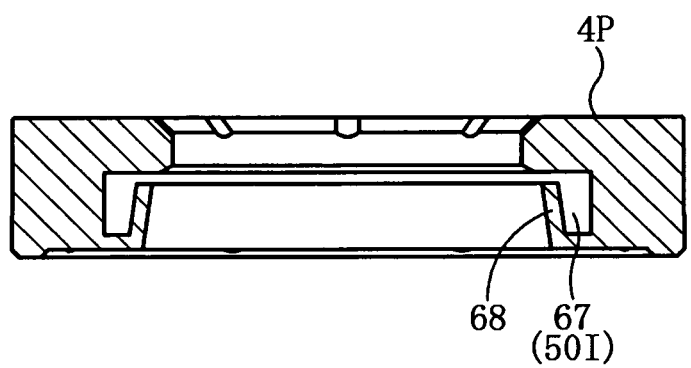
FIG. 23 is a sectional view of an eighth variant embodiment of the ring member.

And an eighth example 4P shown in FIG. 23 of the ring member has an elastic deformation promoting portion 50I that promotes elastic deformation of the external circumferential side wall portion of the tapered female engagement portion 13, when the tapered female engagement portion 13 is engaged in close contact with the tapered male engagement portion 11. This elastic deformation promoting portion 50I has an annular groove 67 that is formed on the wall portion surrounding the tapered female engagement portion 13. An annular wall 68 that is L-shaped in cross section is defined at the lower and circumferentially internal side of this annular groove 67, and the upper end portion of the annular groove 67 opens inward.

Embodiment 9

Figure 24:
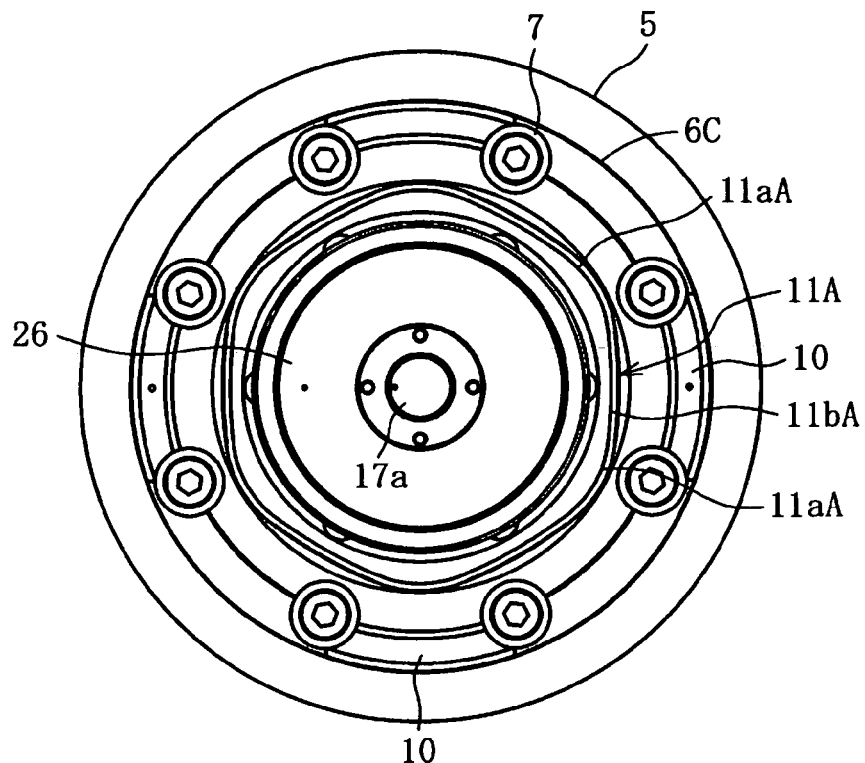
FIG. 24 is a sectional view of a first variant embodiment of the base member according to Embodiment 9.

FIG. 24 is a plan view of a base member 6C; with this first example 6C shown in this FIG. 24 of the base member, the tapered male engagement portion 11A of the base member 6C is made so as to reduce in diameter upwards. The horizontal cross section of this tapered male engagement portion 11A is formed as a regular hexagon, and has six circular arcuate vertex portions 11aA that are convex outward and six side portions 11bA that bulge slightly to the exterior. This tapered male engagement portion 11A is formed integrally with the base member 6C. The tapered female engagement portion of the ring member is formed in a shape that can engage in close contact with this tapered male engagement portion 11A, via elastic deformation of the ring member in the direction to increase its radius.

Since the horizontal cross section of the tapered male engagement portion 11A is a regular hexagon that has the six circular arcuate vertex portions 11aA that are convex outward and the six side portions 11bA that bulge slightly to the exterior, and since this shape is close to circular while being a regular polygon, accordingly the level of waste with the wall portions of the tapered male engagement portion 11A and the tapered female engagement portion and the amount of wasted space are extremely small, so that there is the benefit that the device can be made more compact, and there is also an advantage from the point of view of the cost of manufacture. When the tapered male engagement portion 11A and the tapered female engagement portion are engaged together in close mutual contact, the contact area between the side portions 11bA of the tapered male engagement portion 11A and the side portions of the tapered female engagement portion is increased, so that it is possible to center the ring member with high accuracy, and it is possible to improve the degree of centering.

Figure 25:
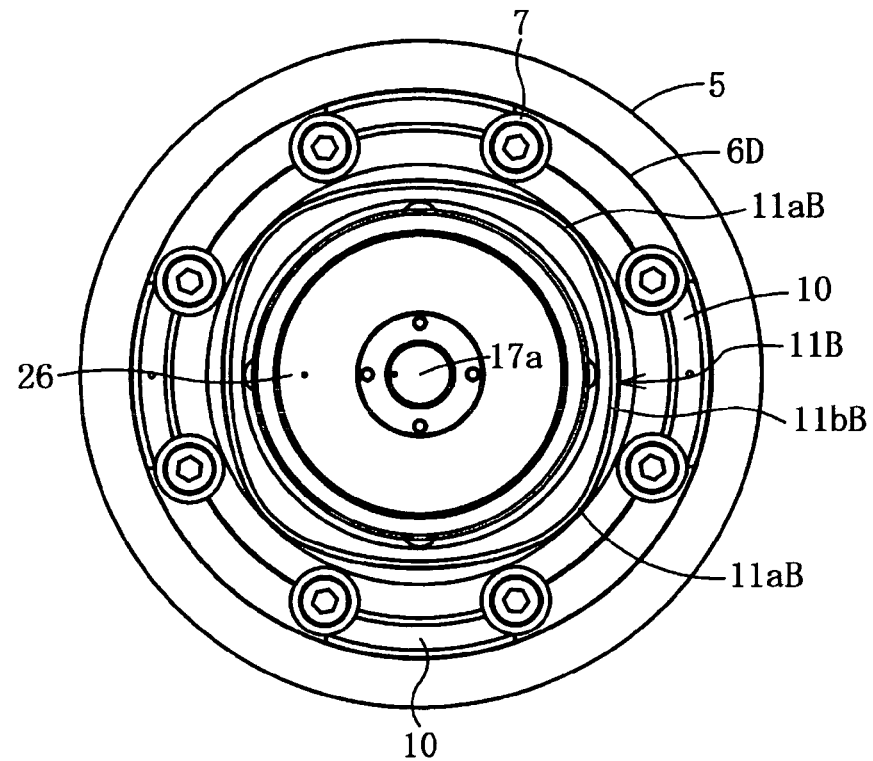
FIG. 25 is a plan view of a second variant embodiment of the base member.

FIG. 25 is a plan view of a base member 6D; with this second example 6D shown in this FIG. 25 of the base member, the tapered male engagement portion 11B of this base member 6D is built so as to reduce in diameter upwards. The horizontal cross section of this tapered male engagement portion 11B is formed as a regular quadrilateral, and has four circular arcuate vertex portions 11aB that are convex outward and four side portions 11bB that bulge slightly to the exterior. This tapered male engagement portion 11B is formed integrally with the base member 6D. The tapered female engagement portion of the ring member is formed in a shape that can engage in close contact with this tapered male engagement portion 11B, via elastic deformation of the external circumferential side wall portion of the tapered female engagement portion in the direction to increase its radius. When the tapered male engagement portion 11B and the tapered female engagement portion are engaged together in close mutual contact, the contact area between the side portions 11bB of the tapered male engagement portion 11B and the side portions of the tapered female engagement portion is increased, so that it is possible to center the ring member with high accuracy, and it is possible to improve the degree of centering. The other structural details, the operation, and the advantages are same as in Embodiment 1.

Embodiment 10

Figure 26:
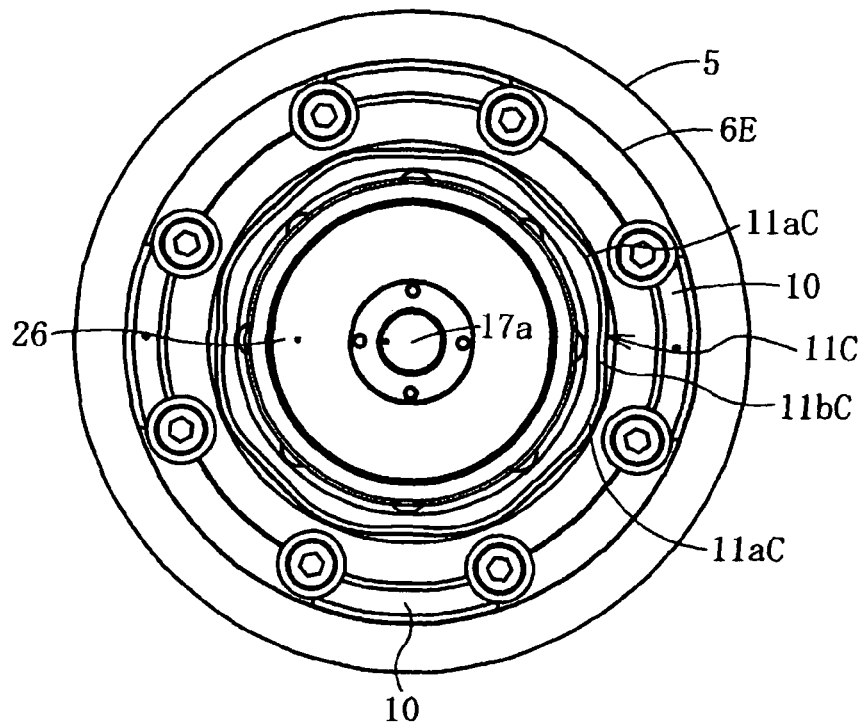
FIG. 26 is a sectional view of a first variant embodiment of the base member according to Embodiment 10.

FIG. 26 is a plan view of a base member 6E; with this first example 6E shown in this FIG. 26 of the base member, the tapered male engagement portion 11C of this base member 6E is built so as to reduce in diameter upwards. The horizontal cross section of this tapered male engagement portion 11C is formed as a regular octagon, and has eight circular arcuate vertex portions 11aC that are convex outward and eight side portions 11bC, with each of the eight side portions 11bC being formed in the shape of a straight line. This tapered male engagement portion 11C is formed integrally with the base member 6E. The tapered female engagement portion of the ring member is formed in a shape that can engage in close contact with this tapered male engagement portion 11C, via elastic deformation of the external circumferential side wall portion of the tapered female engagement portion in the direction to increase its radius. Since each of the eight side portions 11bC is formed in the shape of a straight line, accordingly, when the tapered male engagement portion 11C and the tapered female engagement portion are engaged together in close mutual contact, it is possible to enhance the force that restrains rotation, due to this straight line shape of the eight side portions 11bC.

Figure 27:
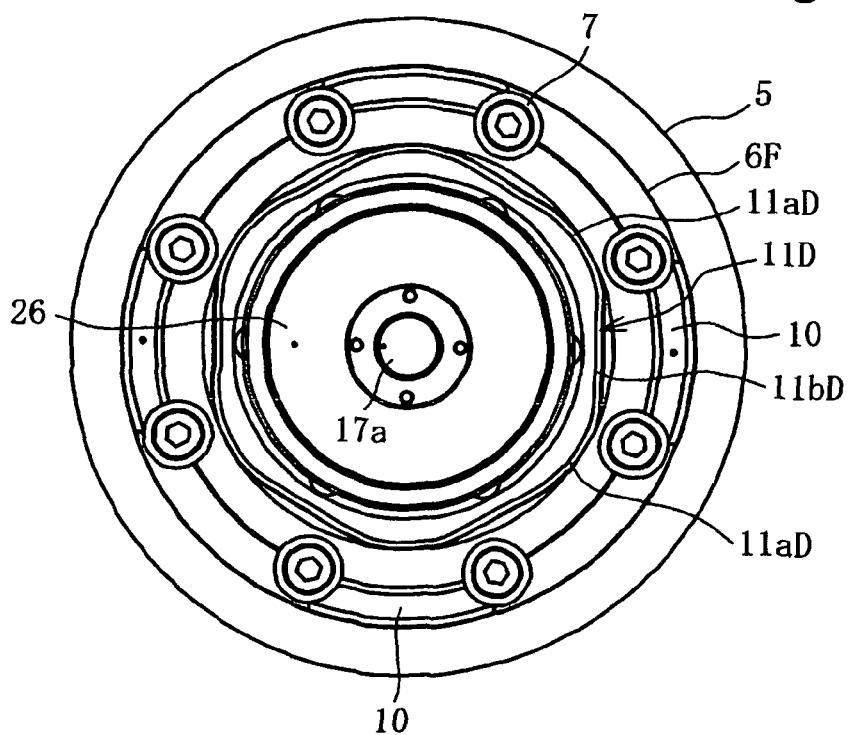
FIG. 27 is a plan view of a second variant embodiment of the base member.

FIG. 27 is a plan view of a base member 6F; with this second example 6F shown in this FIG. 27 of the base member, the tapered male engagement portion 11D of this base member 6F is built so as to reduce in diameter upwards. The horizontal cross section of this tapered male engagement portion 11D is formed as a regular hexagon, and has six circular arcuate vertex portions 11aD that are convex outward and six side portions 11bD, with each of the six side portions 11bD being formed in the shape of a straight line. This tapered male engagement portion 11D is formed integrally with the base member 6F. The tapered female engagement portion of the ring member is formed in a shape that can engage in close contact with this tapered male engagement portion 11D, via elastic deformation of the external circumferential side wall portion of the tapered female engagement portion in the direction to increase its radius. Since each of the six side portions 11bD is formed in the shape of a straight line, accordingly, when the tapered male engagement portion 11D and the tapered female engagement portion are engaged together in close mutual contact, it is possible to enhance the force that restrains rotation, due to this straight line shape of the six side portions 11bD.

Figure 28:
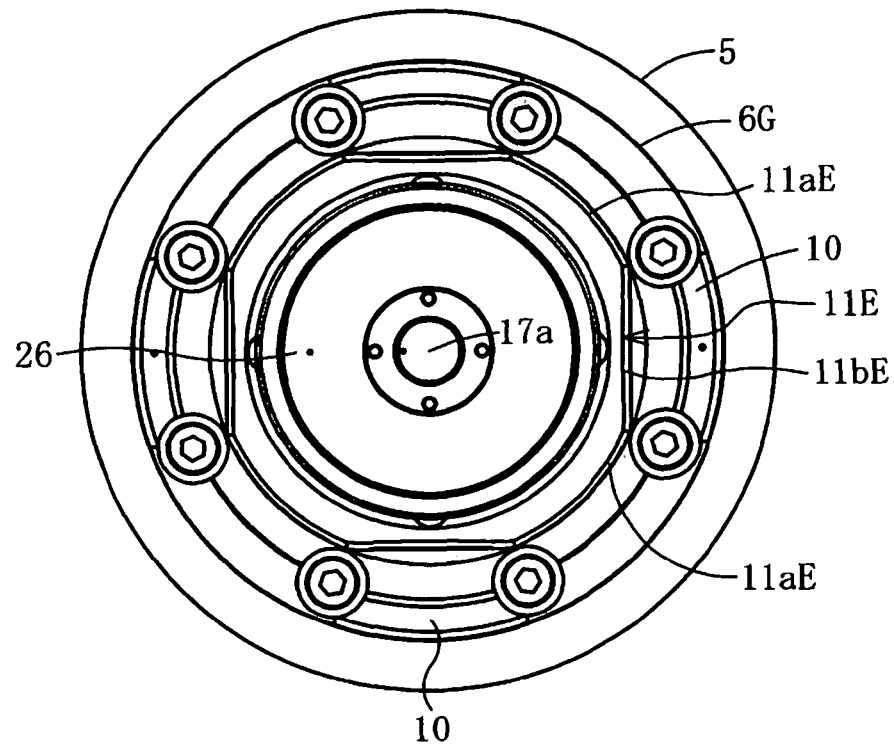
FIG. 28 is a plan view of a third variant embodiment of the base member.

FIG. 28 is a plan view of a base member 6G; with this third example 6G shown in this FIG. 28 of the base member, the tapered male engagement portion 11E of this base member 6G is built so as to reduce in diameter upwards. The horizontal cross section of this tapered male engagement portion 11E is formed as a regular quadrilateral, and has four circular arcuate vertex portions 11aE that are convex outward and four side portions 11bE. Each of the four side portions 11bE is formed in the shape of a straight line, and this tapered male engagement portion 11E is formed integrally with the base member 6G. The tapered female engagement portion of the ring member is formed in a shape that can engage in close contact with this tapered male engagement portion 11F, via elastic deformation of the external circumferential side wall portion of the tapered female engagement portion in the direction to increase its radius. Since each of the four side portions 11bE is formed in the shape of a straight line, accordingly, when the tapered male engagement portion 11E and the tapered female engagement portion are engaged together in close mutual contact, it is possible to enhance the force that restrains rotation, due to this straight line shape of the four side portions 11bE. The other structural details, the operation, and the advantages are same as in Embodiment 1.

Embodiment 11

Figure 29:
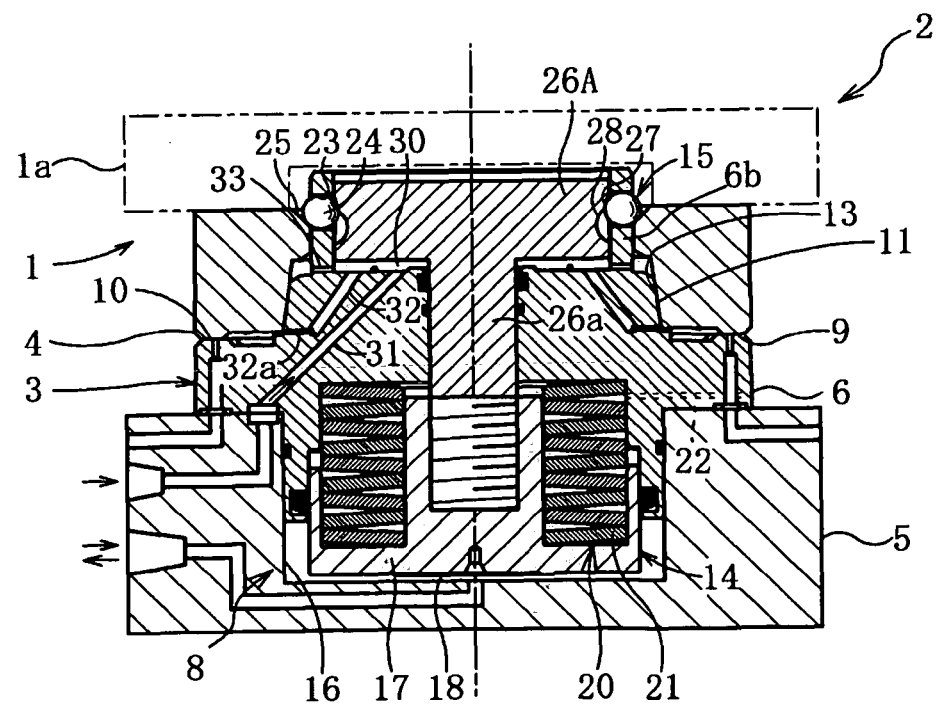
FIG. 29 is a sectional view of a positioning and fixing device and a work pallet according to Embodiment 11.

As shown in FIG. 29, the flat plate member 26A is disposed so as to slide freely up and down on the inside of the barrel portion 6b, and is formed integrally with a rod portion 26a that extends downward from its center portion. Eight inclined portions 27 for ball driving and concave portions 28 for ball retraction are provided on the external circumferential portion of the flat plate member 26A, so as to correspond to the eight ball reception holes 23. The lower portion of this rod portion 26a is screwed to the center portion of the piston member 17, in a state in which the eight inclined portions 27 for ball driving and concave portions 28 for ball retraction correspond to the eight ball reception holes 23. An annular air chamber 30 is defined between this circular plate member 26A and the base member 6. The other structural details, the operation, and the advantages are same as in Embodiment 1.

Embodiment 12

Figure 30:
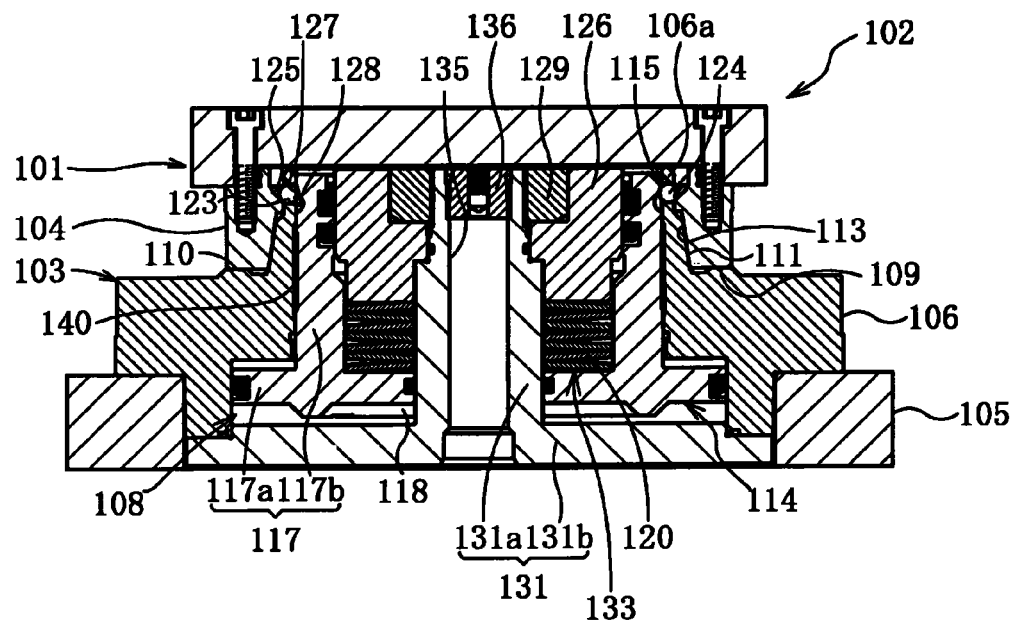
FIG. 30 is a sectional view of a positioning and fixing device and a work pallet according to Embodiment 12.
Figure 31:
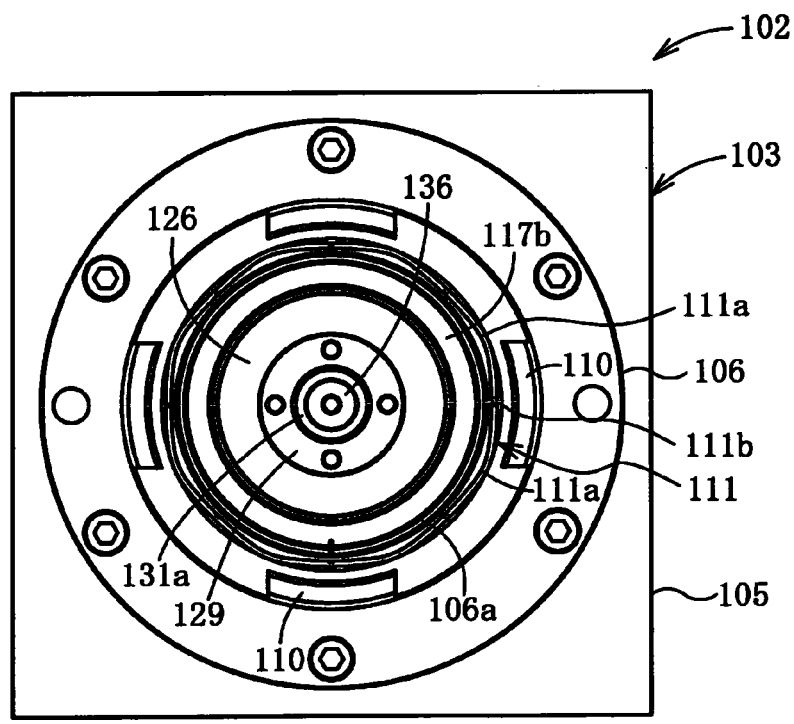
FIG. 31 is a plan view of the positioning and fixing device.

Now a positioning and fixing device 102 according to a twelfth embodiment will be explained. As shown in FIGS. 30 and 31, this positioning and fixing device 102 is provided for positioning and fixing a work pallet 101 in the vertical direction and in the horizontal direction. This positioning and fixing device 102 comprises a base side unit 103 and a ring member 104 that is provided to the work pallet 101. The base side unit 103 comprises a lower base member 105, a base member 106, and a clamp mechanism 108.

The base member 106 comprises: a Z reference surfaces 110 that can receive a lower end reference surface 109 of the ring member 104 and position it in the vertical direction; a tapered male engagement portion 111 whose horizontal cross section has a plurality of circular arcuate vertex portions 111a that are convex outward and a plurality of side portions 111b, and that reduces in diameter upwards; and a barrel portion 106a that can be inserted into a ring portion of the ring member 104. And the ring member 104 comprises the annular lower end reference surface 109 and a tapered female engagement portion 113 that is capable of engaging from above to the tapered male engagement portion 111 so that this lower end reference surface 109 contacts against the Z reference surfaces of the base member 106, and whose horizontal cross section is formed as a regular polygon that has a plurality of circular arcuate vertex portions that are convex outward and a plurality of side portions. The tapered female engagement portion 113 engages in close contact with the tapered male engagement portion 111 due to elastic deformation of the external circumferential side wall portions of the tapered female engagement portion 113 in the direction to increase its radius. It should be understood that it is desirable for the thickness of this ring member 104 in the radial direction to be made small, so that it is easily elastically deformed when it is fixed to the base member 106.

The clamp mechanism 108 comprises a hydraulic cylinder for clamping 114 and a ball lock mechanism 115. The hydraulic cylinder 114 has an annular piston member 117 and a bottom lid member 131 that constitutes a portion of a hydraulic pressure operation chamber 118. This annular piston member 117 has an annular piston portion 117a and an annular piston rod 117b that extends upward from this annular piston portion 117a, and the upper portion of the annular piston rod 117b is fitted into the barrel portion 106a so as to slide freely up and down therein.

The ball lock mechanism 115 comprises a plurality of ball reception holes 123 that are formed in the barrel portion 106b, a plurality of balls 124 that are installed in these ball reception holes 123 and are movable in the radial direction, a plurality of ball reception grooves 125 that are formed in an internal circumferential portion of the upper end portion of the ring member 104 so as to correspond to the plurality of ball reception holes 123, and a plurality of inclined portions 127 for ball driving and a plurality of concave portions 128 for ball retraction that are formed on an external circumferential portion of the annular piston rod 117b so as to correspond to the plurality of ball reception holes 123 that hold the plurality of balls 124.

The bottom lid member 131 comprises a center barrel portion 131a that has a through hole 135 in its center and that is inserted into the annular piston portion 117a of the annular piston member 117, and a bottom wall portion 131b that closes the bottom portion of the hydraulic pressure operation chamber 118. The center barrel portion 131a and bottom wall portion 131b are formed integrally with one another, and this bottom lid member 131 is fixed to the base member 106. An annular spring receiving chamber 133 is defined between the barrel portion 131a of the bottom lid member 131, the annular piston 117, and the annular member 126, and a multi-layer coned disk springs 120 that can be compressed in order to bias the annular piston 117 in the direction of clamping (i.e. downwards) is received in this spring receiving chamber 133.

The annular member 126 that closes off the upper end of the spring receiving chamber 133 is provided at an upper external circumferential portion of the center barrel portion 131a of the bottom lid member 131. This annular member 126 is fixed by a nut member 129 being screwingly engaged to the barrel portion 131a from above the annular member 126. The hydraulic pressure operation chamber 118 is defined between the bottom lid member 131 and the annular piston portion 117a. A plug member 136 is removably installed at the upper end portion of the through hole 135 that is pierced through the center barrel portion 131a of the bottom lid member 131. If, for example, a sensor or a switch is provided to the work pallet 1, then the plug member 136 may be taken off, and a hose or an electric cable or the like may be led to the work pallet from below by passing it through the through hole.

An annular space 140 is defined in the gap between the upper inner circumferential surface of the base 106 and the outer circumferential surface of the annular piston rod portion 117b. Due to this annular space 140, when the tapered female engagement portion 113 is engaged to the tapered male engagement portion 111, the tapered female engagement portion 113 is engaged in close contact to the tapered male engagement portion 111 via elastic deformation of the inner circumferential side wall portion of the tapered male engagement portion 111 in the direction to reduce its radius, along with very small elastic deformation of the external circumferential side wall portion of this tapered female engagement portion 113 in the direction to increase its radius. It should be understood that it would also be acceptable for the upper end portion of this annular space 140 to be elongated and to be communicated with the ball reception holes 123.

The operation and the advantages of the positioning and fixing device 102 explained above will now be explained.

When a work pallet 101 to which a workpiece is fixed is to be positioned and fixed upon the table of the machine tool, the ring member 104 and the base member 106 are engaged together in a state in which they match one another in rotational phase around their axis, the tapered female engagement portion 113 is lightly contacted against the tapered male engagement portion 111, and the state is established in which the lower end reference surface 109 of the ring member 104 is lightly contacted against the four Z reference surfaces 110. Next, when the hydraulic pressure in the hydraulic pressure operation chamber 118 is changed over to drain pressure, the ring member 104 is brought into the clamped state in which it is clamped to the base side unit 103: i.e. the ring member 104 is brought into a state of close contact with the base member 106 by very small elastic deformation of the external circumferential side wall portion of this tapered female engagement portion 113 in the direction to increase its radius and very small elastic deformation of the internal circumferential side wall portion of the tapered male engagement portion of the base member 106 in the direction to reduce its radius, so that the lower end reference surface 109 is brought into the state of close contact with the Z reference surfaces 110.

By closely contacting the lower end reference surface 109 against the Z reference surfaces 110, it is possible to position the work pallet 101 in the vertical direction (the Z direction) with high accuracy. And, by closely contacting the tapered female engagement portion 113 to the tapered male engagement portion 111, it is possible to position the work pallet 101 in the horizontal direction with high accuracy. Furthermore, it is possible to position the rotational phase of the work pallet 101 with respect to the base member 106 around the vertical axis with high accuracy, and it is possible to restrain the work pallet 101, so that it does not rotate around its axis with respect to the base member 106.

Since the upper portion of the annular piston rod 117*b* of the hydraulic cylinder 114 is fitted into the barrel portion 131*a* so as to slide freely up and down therein, with the plurality of ball drive inclined portions 127 and the plurality of ball retraction concave portions 128 that are formed so as to correspond to the plurality of ball reception holes 123 being provided in the external circumferential portion of this annular piston rod 117*b*, and since the through hole 135 is provided in the neighborhood of the axis of the annular piston member 117, accordingly it is possible to pass a hose or an electrical signal cable or the like by taking advantage of this through hole 135, so that it is possible to make effective use of the space. Since the other details of operation and the advantages are same as in Embodiment 1, explanation thereof will here be omitted.

Embodiment 13

Next, a positioning and fixing device 2L according to a thirteenth embodiment will be explained on the basis of FIGS. 32 through 37.

Figure 32:
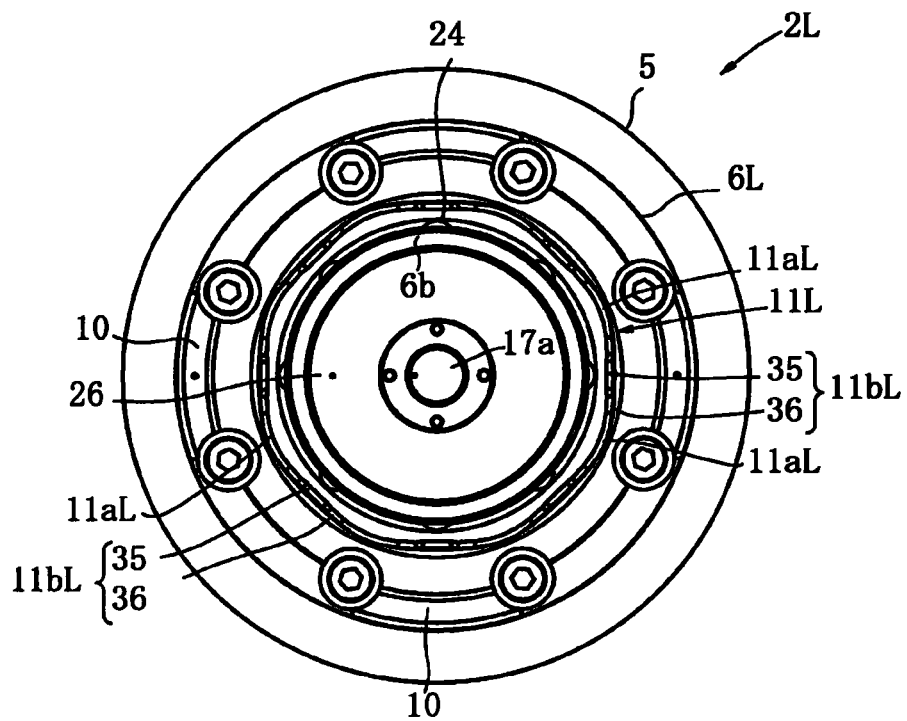
FIG. 32 is a sectional view of a positioning and fixing device according to Embodiment 13.
Figure 33:
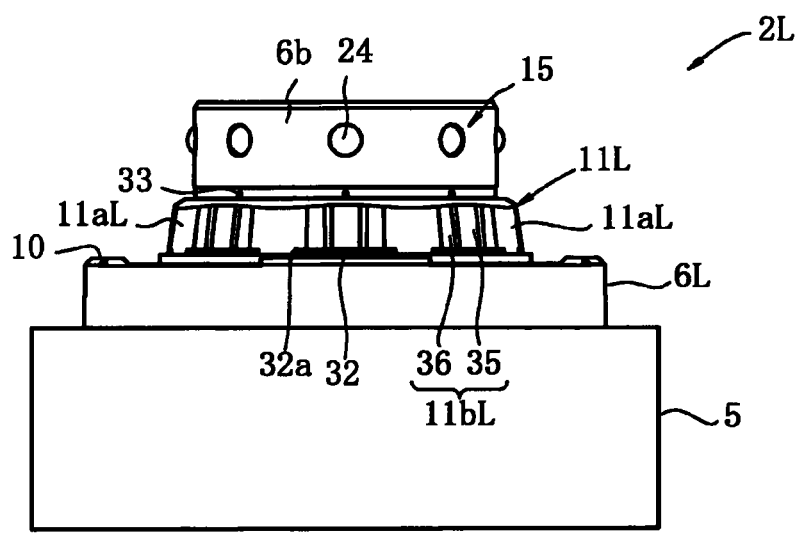
FIG. 33 is a side view of the positioning and fixing device.
Figure 34:
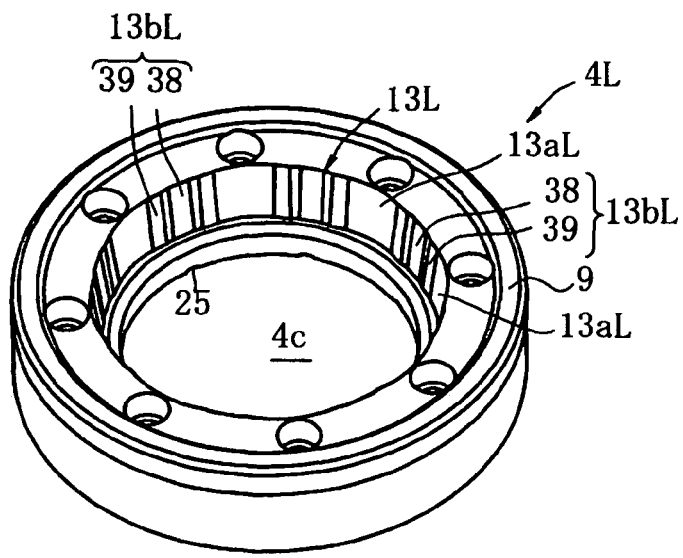
FIG. 34 is a perspective view of the ring member.
Figure 35:
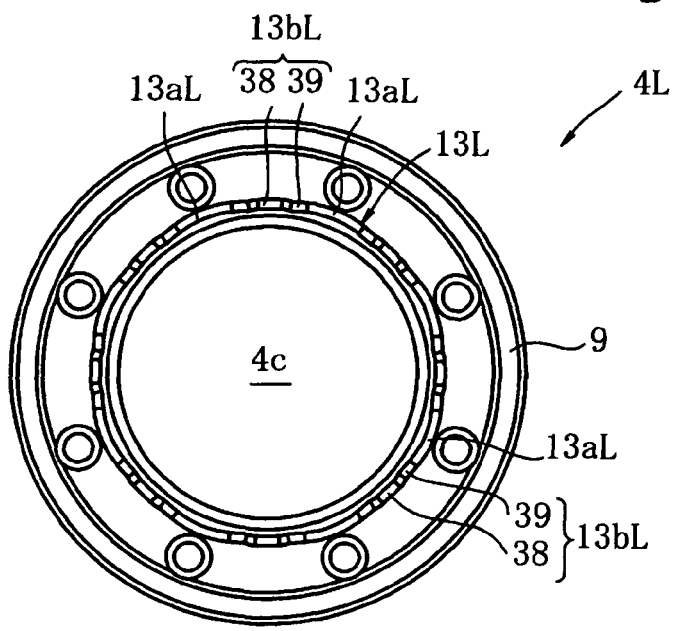
FIG. 35 is a plan view of the ring member.
Figure 36:
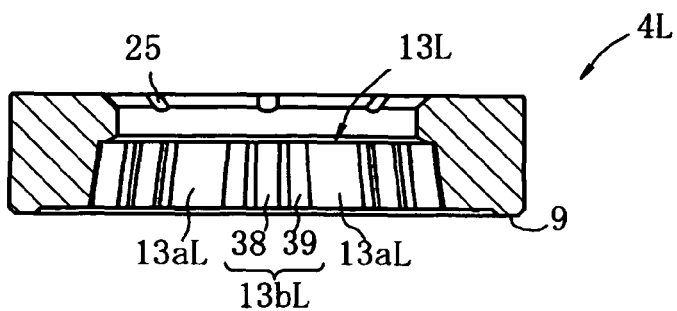
FIG. 36 is a sectional view of the ring member.
Figure 37:
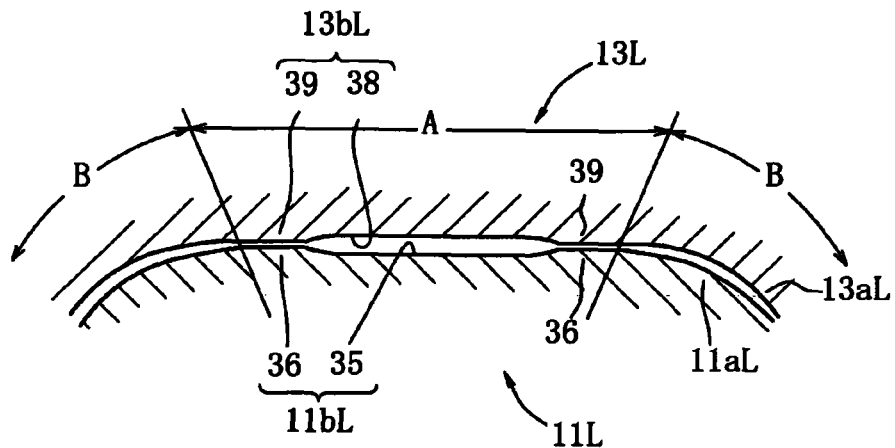
FIG. 37 is an enlarged view of the side portions of the tapered male engagement portion and the tapered female engagement portion.

With this positioning and fixing device 2L, as shown in FIGS. 32 and 33, the horizontal cross section of a tapered male engagement portion 11L that is formed on a base member 6L has eight circular arcuate vertex portions 11*a*L that are convex outward and eight side portions 11*b*L, and each of these side portions 11*b*L in cross section has a concave relief portion 35 that is formed at its central portion and a pair of close fitting engagement portions 36 that are formed at the two ends of this concave relief portion 35.

As shown in FIGS. 34 through 37, a tapered female engagement portion 13L that is formed on a ring member 4L has, in horizontal cross section, eight circular arcuate vertex portions 13*a*L that are convex outward and eight side portions 13*b*L, and each of these side portions 13*b*L in cross section has a concave relief portion 38 that is formed at its central portion and a pair of close fitting engagement portions 39 that are formed at the two ends of this concave relief portion 38. It should be understood that here by "side portion" is meant the portion over the range A in FIG. 37, while by "circular arcuate vertex portion" is meant the portion over the range B in FIG. 37.

The concave relief portions 35 of the tapered male engagement portion 11L are made in the shape of shallow grooves that extend in the vertical direction of the tapered surface of the base member 6 (refer to FIG. 33). And the concave relief portions 38 of the tapered female engagement portion 13L are made in the shape of shallow grooves that extend in the vertical direction of the tapered surface of the ring member 6 (refer to FIG. 35). Each of these concave relief portions 35, 38 is formed over approximately half of the span of its side portion 11*b*L, 13*b*L. The pair of close fitting engagement portions 36 and the pair of close fitting engagement portions 39 that oppose them are formed so as to be positioned in a mutually parallel state (refer to FIG. 37).

When this tapered male engagement portion 11L is engaged to the tapered female engagement portion 13L, while slight gaps are provided between the circular arcuate vertex portions 11*a*L and the circular arcuate vertex portions 13*a*L, it is engaged in close contact to the tapered female engagement portion 13L via elastic deformation of the external circumferential side wall portions. At this time, by the pairs of close fitting engagement portions 36 and the pairs of close fitting engagement portions 39 being engaged together in close contact, the accuracy of positioning in the horizontal direction and the rotational restraining force are enhanced as compared with the above Embodiment 1, since the number of close contact spots is twice as great.

Furthermore, since the compressive stress upon the pairs of close fitting engagement portions 36, 39 is increased due to the provision of the concave relief portions 35 upon the side portions 11*b*L and of the concave relief portions 38 upon the side portions 13*b*L, accordingly it is possible to promote very small elastic deformation of the external circumferential side wall portions of the tapered female engagement portion 13L in the direction to increase its radius, and to promote very small elastic deformation of the internal circumference of the tapered male engagement portion 11L at its wall portion in the direction to reduce its radius, thus enhancing the quality of adherence between them. Furthermore with this embodiment it is possible to reduce the cost of the polishing processing, as compared with the case in which precision polishing processing is performed upon the entire tapered surfaces of the tapered male engagement portion 11 and the tapered female engagement portion 13, since there is no requirement to perform any polishing processing upon the surfaces of the relief concave portions 35 and 38. The other structural details, the operation, and the advantages are same as in Embodiment 1.

Next, variant embodiments in which the side portions 11*b*L, 13*b*L of this embodiment are partially altered will be explained.

Figure 38:
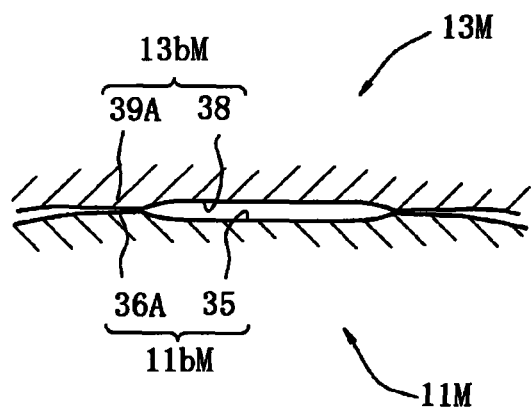
FIG. 38 is an enlarged sectional view of essential portions of a first variant embodiment of the side portions of the tapered male engagement portion and the tapered female engagement portion according to a variant of Embodiment 13.

As shown in FIG. 38, with the side portions 11*b*M and 13*b*M of a first example, the pairs of close fitting engagement portions 36A and 39A are formed in tapered shapes, so that they approach the more towards their opposites, the closer to the concave relief portions 35, 38.

Figure 39:
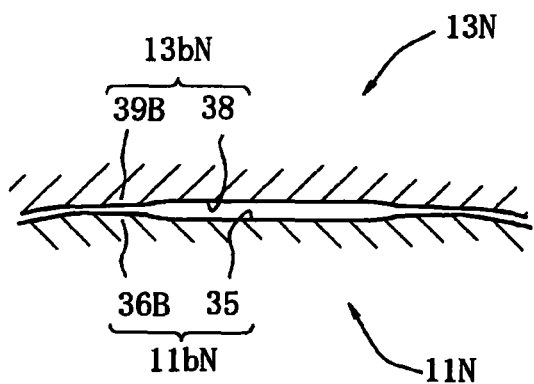
FIG. 39 is an enlarged sectional view of essential portions of a second variant embodiment of the side portions of the tapered male engagement portion and the tapered female engagement portion.

As shown in FIG. 39, with the side portions 11*b*N and 13*b*N of a second example, the pairs of close fitting engagement portions 36B and 39B are formed in tapered shapes, and approach the more towards their opposites, the further from the concave relief portions 35, 38.

Figure 40:
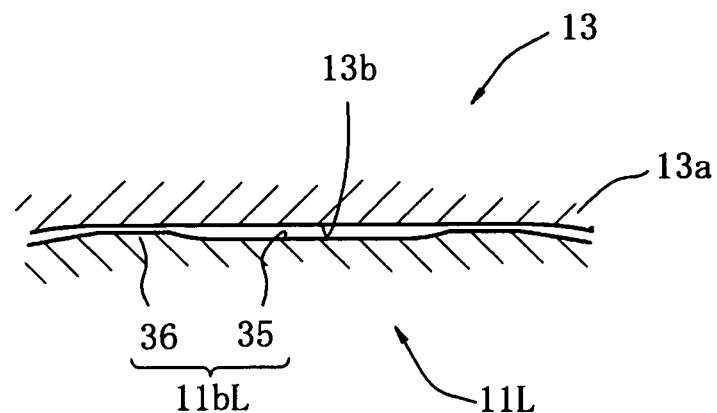
FIG. 40 is an enlarged sectional view of essential portions of a third variant embodiment of the side portions of the tapered male engagement portion and the tapered female engagement portion.

As shown in FIG. 40, with the side portions 11*b*L of a third example, the pairs of close fitting engagement portions 36 of the concave relief portions 35 are made only upon the tapered male engagement portions 11L, and are formed so as to be parallel with the straight line shaped side portions 13*b* of the tapered female engagement portions 13 that oppose these pairs of close fitting engagement portions 36.

Figure 41:
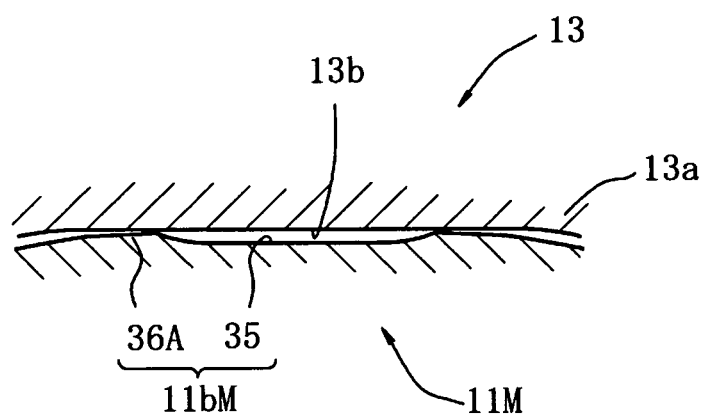
FIG. 41 is an enlarged sectional view of essential portions of a fourth variant embodiment of the side portions of the tapered male engagement portion and the tapered female engagement portion.

As shown in FIG. 41, with the side portions 11*b*M of a fourth example, the pairs of close fitting engagement portions 36A of the concave relief portions 35 are made only upon the tapered male engagement portions 11M, and these pairs of close fitting engagement portions 36A are formed in tapered shapes so as to approach the more towards their opposites, the closer to the concave relief portions 35.

Figure 42:
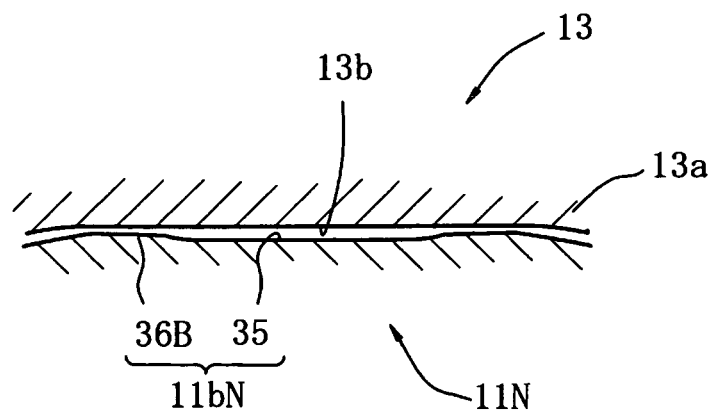
FIG. 42 is an enlarged sectional view of essential portions of a fifth variant embodiment of the side portions of the tapered male engagement portion and the tapered female engagement portion.

As shown in FIG. 42, with the side portions 11*b*N of a fifth example, the pairs of close fitting engagement portions 36B of the concave relief portions 35 are made only upon the tapered male engagement portions 11N, and these pairs of close fitting engagement portions 36B are formed in tapered shapes so as to approach the more towards their opposites, the further from the concave relief portions 35.

Figure 43:
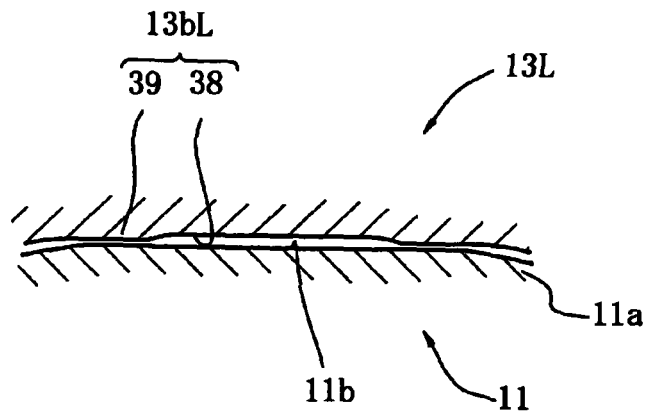
FIG. 43 is an enlarged sectional view of essential portions of a sixth variant embodiment of the side portions of the tapered male engagement portion and the tapered female engagement portion.

As shown in FIG. 43, with the side portions 13*b*L of a sixth example, the pairs of close fitting engagement portions 39 of the concave relief portions 38 are made only upon the tapered female engagement portions 13L, and are formed so as to be parallel with the side portions 11*b* of the tapered male engagement portions 11 that oppose these pairs of close fitting engagement portions 39.

Figure 44:
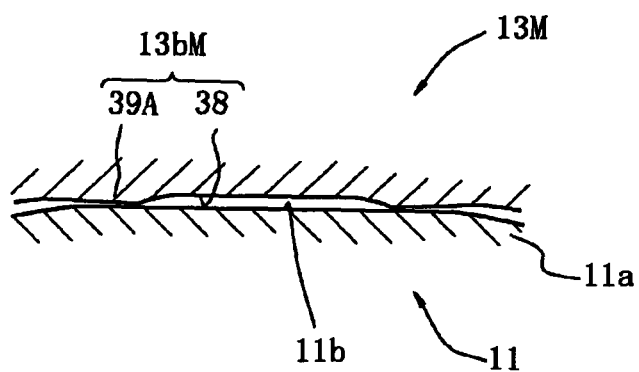
FIG. 44 is an enlarged sectional view of essential portions of a seventh variant embodiment of the side portions of the tapered male engagement portion and the tapered female engagement portion.

As shown in FIG. 44, with the side portions 13*b*M of a seventh example, the pairs of close fitting engagement portions 39A of the concave relief portions 38 are made only upon the tapered female engagement portions 13M, and these pairs of close fitting engagement portions 39A are formed in tapered shapes so as to approach the more towards their opposites, the closer to the concave relief portions 38.

Figure 45:
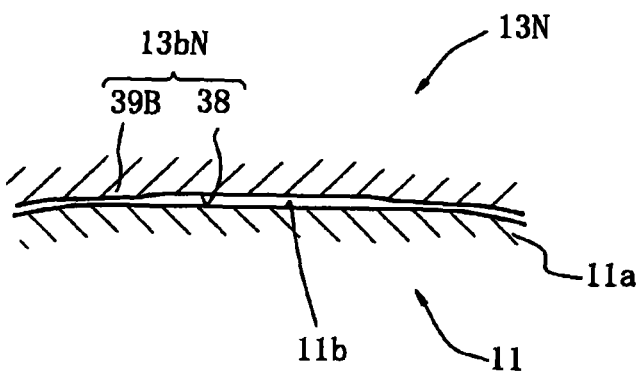
FIG. 45 is an enlarged sectional view of essential portions of an eighth variant embodiment of the side portions of the tapered male engagement portion and the tapered female engagement portion.

And, as shown in FIG. 45, with the side portions 13*b*N of an eighth example, the pairs of close fitting engagement portions 39B of the concave relief portions 38 are made only upon the tapered female engagement portions 13N, and these pairs of close fitting engagement portions 39B are formed in tapered shapes so as to approach the more towards their opposites, the further from the concave relief portions 38.

Embodiment 14

Figure 46:
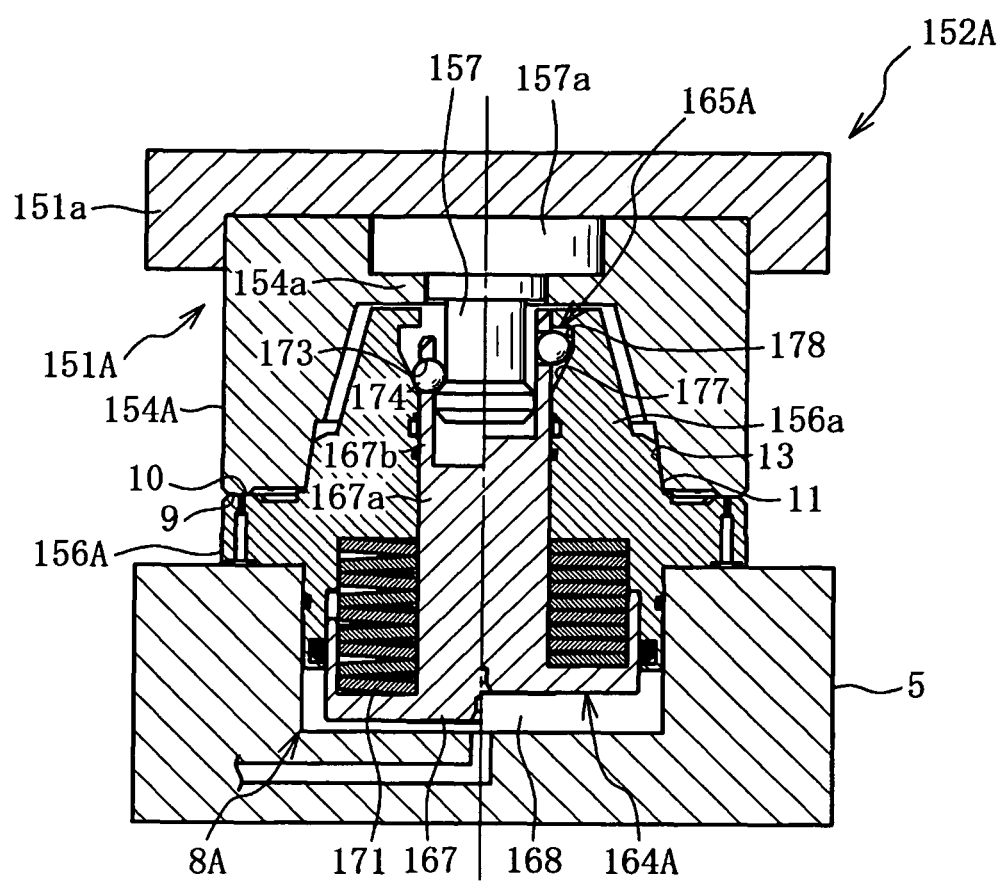
FIG. 46 is a sectional view of a work pallet and a positioning and fixing device according to Embodiment 14.

A clamp mechanism 8A that can be employed instead of the clamp mechanism 8 of the above Embodiment 1 will now be explained. As shown in FIG. 46, this clamp mechanism 8A of a positioning and fixing device 152A comprises a hydraulic cylinder for clamping 164A and a ball lock mechanism 165A. A collar portion 157*a* of a pull stud 157 is sandwiched between a work pallet main body 151*a* of the work pallet 1A and an engagement portion 154*a* of the ring member 154A, and the pull stud 157 is fixed thereto. A plurality of balls 174 are held in a plurality of ball reception holes 173 that are formed in an end barrel portion 167*b* of a rod portion 167*a*, and a recess 178 and a taper surface 177 whose diameter decreases downwards are formed on an internal circumferential portion of a tapered annular portion 156*a* of the base member 156A.

When the hydraulic pressure in the hydraulic chamber 168 is changed over to drain pressure during clamping, the piston member 167 is driven downwards by the elastic force of the multi-layer coned disk springs 171, and the plurality of balls 174 are driven inwards in the radial direction by the taper surface 177 so that they engage to the head portion of the pull stud 157, and thereby the pull stud 157 is pressed downwards (refer to the left half of FIG. 46). And, when the clamping is to be released, hydraulic pressure is supplied to the hydraulic chamber 168 so that the piston member 167 is raised, and the plurality of balls 174 are partially retracted into their recesses 178, so that the clamping is released (refer to the right half of FIG. 46). The other structural details, the operation, and the advantages are same as in Embodiment 1.

Embodiment 15

Figure 47:
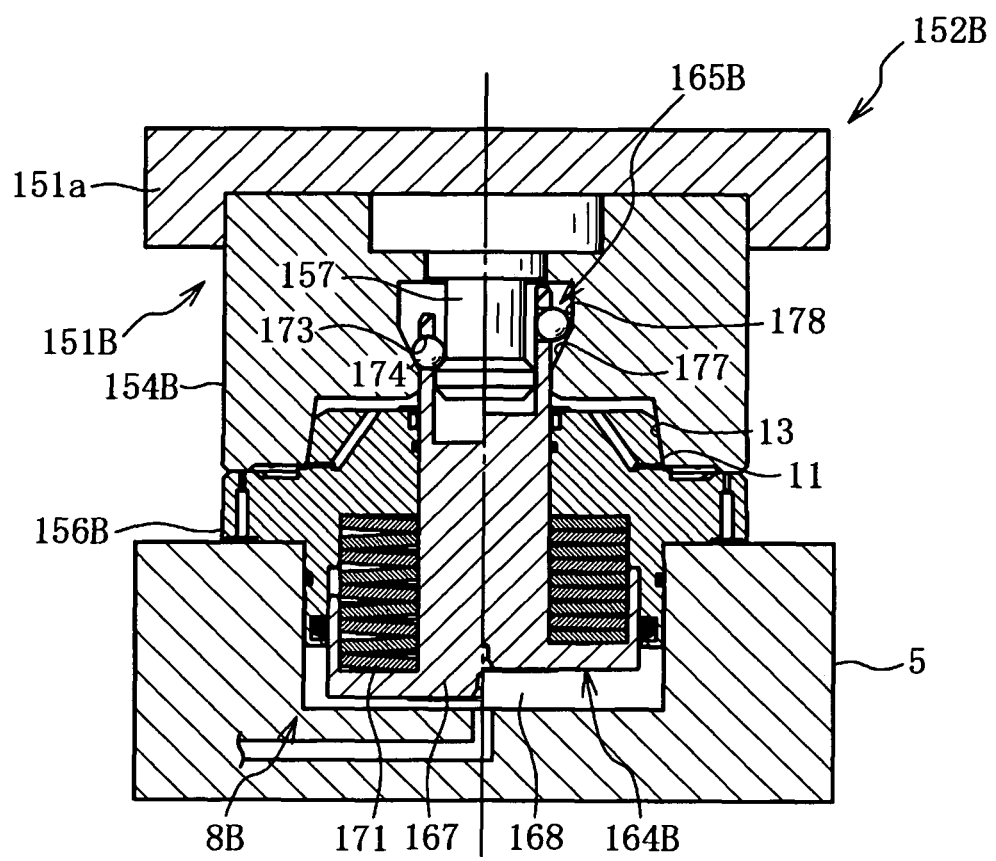
FIG. 47 is a sectional view of a work pallet and a positioning and fixing device according to Embodiment 15.

A clamp mechanism 8B that can be employed instead of the clamp mechanism 8 of the above Embodiment 1 will now be explained. As shown in FIG. 47, with this clamp mechanism 8B of this positioning and fixing device 152B, the tapered annular portion 156*a* of the base member 156A is omitted, with the recesses 178 and the taper surface 177 of the ball lock mechanism 165B being formed on an internal circumferential portion of the ring member 154B. When during clamping the piston member 167 of the hydraulic cylinder for clamping 164B is driven downwards, the plurality of balls 174 press the pull stud 157 and the taper surface 177 downwards via the plurality of ball reception holes 173, and thereby the work pallet 151B is clamped to the base member 156B (refer to the left half of FIG. 47). And, when the clamping is to be released, the piston member 167 is raised, and the plurality of balls 174 are partially retracted into their recesses 178, so that the clamping is released (refer to the right half of FIG. 47). The other structural details, the operation, and the advantages are same as in Embodiment 1.

Embodiment 16

Figure 48:
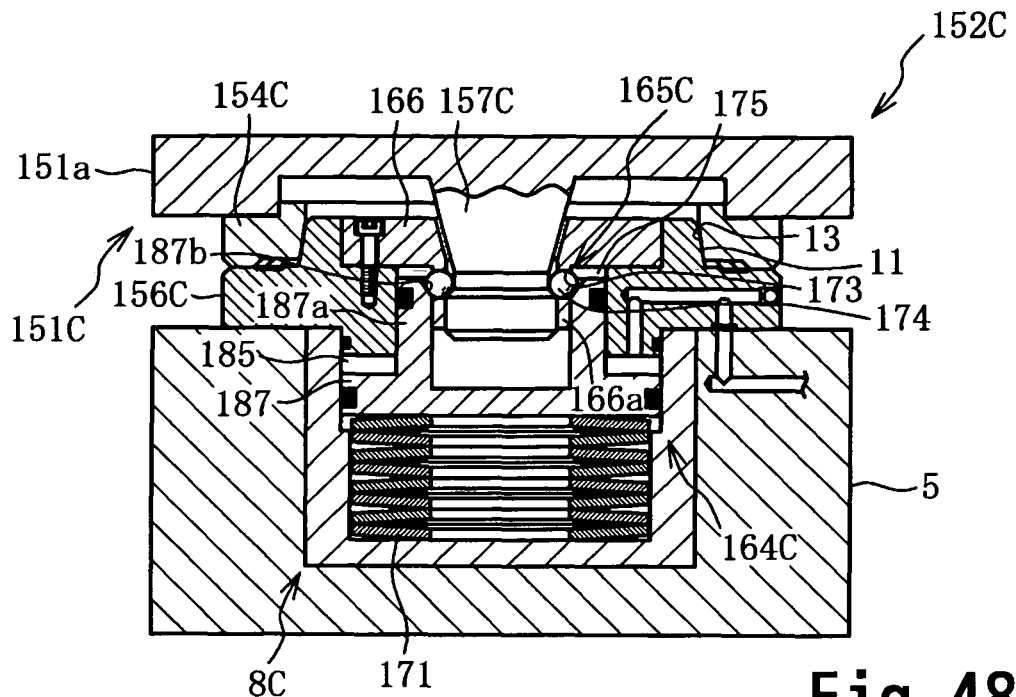
FIG. 48 is a sectional view of a work pallet and a positioning and fixing device according to Embodiment 16.

A clamp mechanism 8C that can be employed instead of the clamp mechanism 8 of the above Embodiment 1 will now be explained. As shown in FIG. 48, this clamp mechanism 8C of a positioning and fixing device 152C comprises a hydraulic cylinder for clamping 164C and a ball lock mechanism 165C. A taper surface 187*b* is formed on the end of an inner circumferential portion of a tubular rod portion 187*a* of the piston member 187. A ball holding member 166 that is fixed by bolts to the base member 156C has a barrel portion 166*a* in which a plurality of ball reception holes 173 are formed.

During clamping, the piston member 187 is driven upwards by the multi-layer coned disk springs 171, and the taper surface 187*b* drives the plurality of balls 174 in the inward radial direction, so that they are engaged to the head portion of a pull stud 157C that is formed integrally with a fixed work pallet 151C, and thereby the work pallet 151C is clamped to the base member 156C via the ring member 154C. And, when this clamping is to be released, hydraulic pressure is supplied to the annular hydraulic chamber 185 and the piston member 187 is lowered, so that the plurality of balls 174 can retract into an annular space 175 at the end of the rod portion 187*a*, so that the clamping is released. The other structural details, the operation, and the advantages are same as in Embodiment 1.

Embodiment 17

Figure 49:
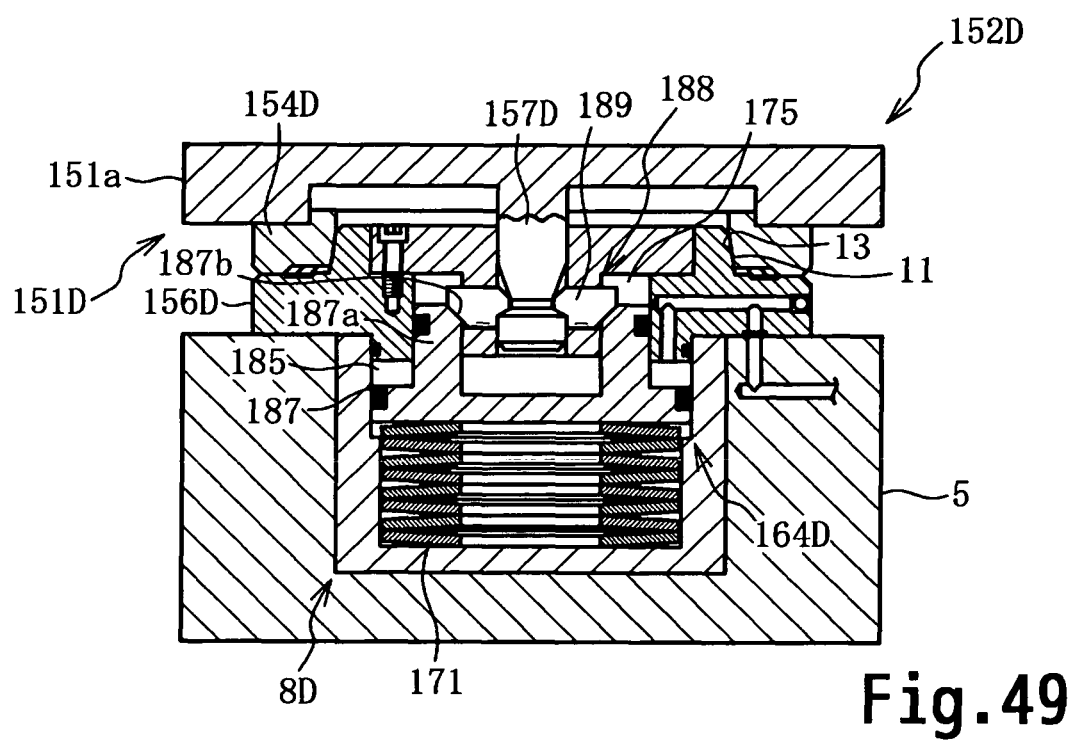
FIG. 49 is a sectional view of a work pallet and a positioning and fixing device according to Embodiment 17.

A clamp mechanism 8D that can be employed instead of the clamp mechanism 8 of the above Embodiment 1 will now be explained. As shown in FIG. 49, this clamp mechanism 8D of a positioning and fixing device 152D comprises a hydraulic cylinder for clamping 164D and a lock mechanism 188 that employs a plurality of engagement pins 189, instead of the above plurality of balls 174. During clamping, the plurality of engagement pins 189 are driven in the radially inward direction by a taper surface 187*b* and engage to the head portion of a pull stud 157D, and thereby the work pallet 151D is clamped to the base member 156D via the ring member 154D. And, when the clamping is to be released, the piston member 187 is lowered, and the plurality of engagement pins 189 can be retracted into an annular space 175, so that the clamping is released. The other structural details, the operation, and the advantages are same as in Embodiment 1.

Embodiment 18

Figure 50:
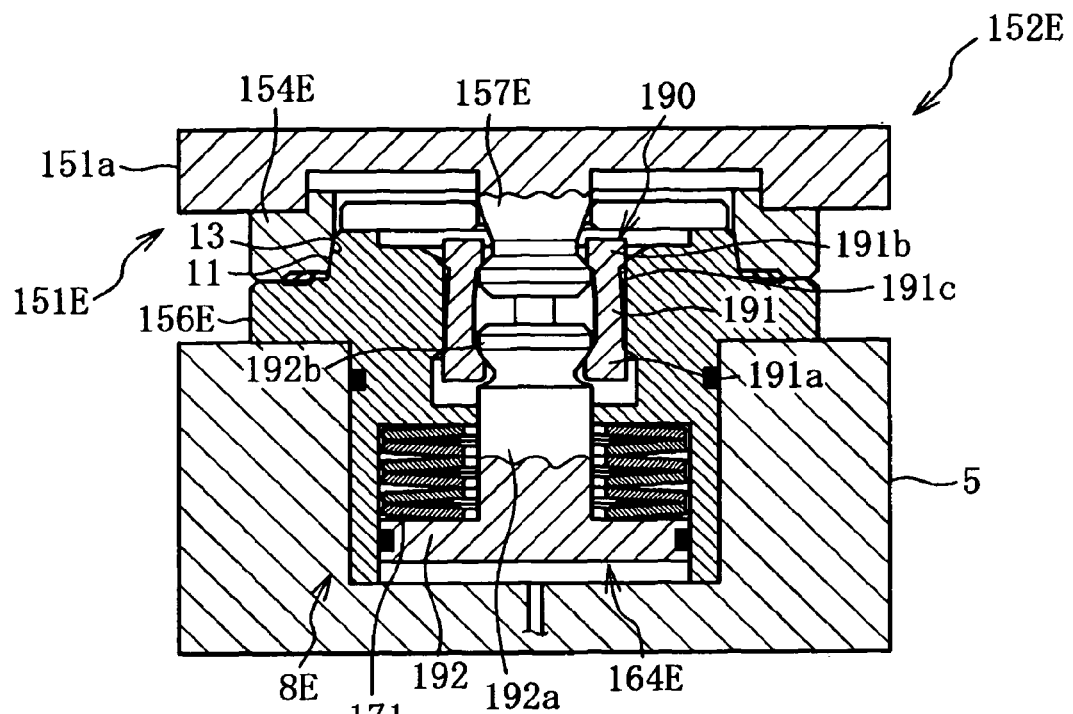
FIG. 50 is a sectional view of a work pallet and a positioning and fixing device according to Embodiment 18.

A clamp mechanism 8E that can be employed instead of the clamp mechanism 8 of the above Embodiment 1 will now be explained. As shown in FIG. 50, this clamp mechanism 8E of a positioning and fixing device 152E comprises a hydraulic cylinder for clamping 164E and a collet mechanism 190. During clamping, the head portion 192b of a rod portion 192a of a piston member 192 presses the base portions 191a of a plurality of collets 191 downwards, and the tip end portions 191b of these collets 191 are driven in the inward radial direction by the upper end portion of an internal circumferential side wall portion of the base member 156E and are engaged with the head portion of a pull stud 157E, so that the work pallet 151E is clamped to the base member 156E via the ring member 154E. And, when the clamping is to be released, the rod portion 192a presses the base portion 191a upward, so that relief grooves 191c in the collets 191 engage to the upper end portion of the internal circumferential side wall portion, and the clamping is released. The other structural details, the operation, and the advantages are same as in Embodiment 1.

Embodiment 19

Figure 51:
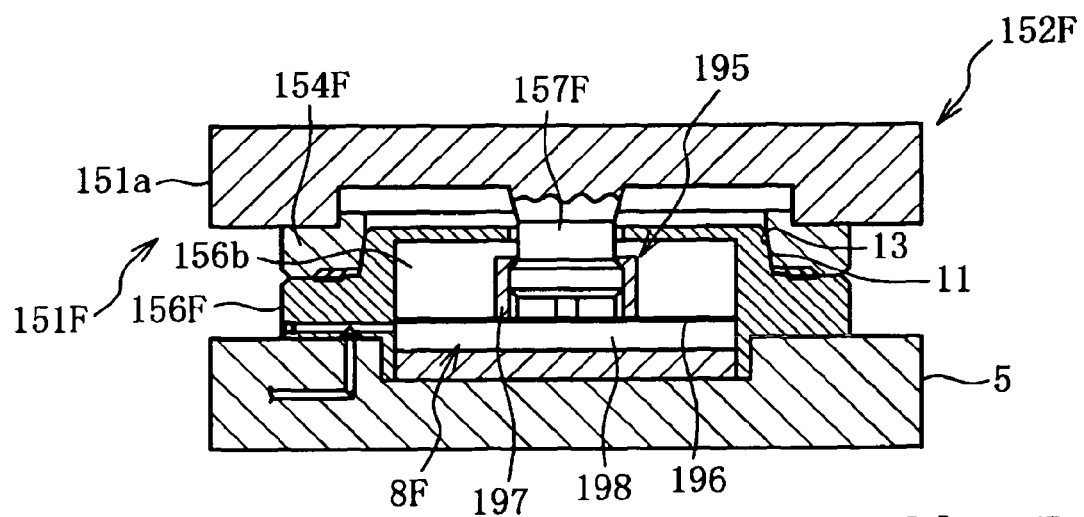
FIG. 51 is a sectional view of a work pallet and a positioning and fixing device according to Embodiment 19.

A clamp mechanism 8F that can be employed instead of the clamp mechanism 8 of the above Embodiment 1 will now be explained. As shown in FIG. 51, this clamp mechanism 8F of a positioning and fixing device 152F comprises a diaphragm mechanism 195. A diaphragm 196 is a metallic plate of thickness around 1 mm and is disposed in an internal space 156b of the base member 156F, with its external circumferential portion being fixed to the base member 156F. During clamping, a plurality of engagement members 197 that are provided at regular intervals upon the upper surface of the diaphragm 196 are engaged to the head portion of a pull stuff 157F, and thereby the work pallet 151F is clamped to the base member 156F via the ring member 154F. And, when the clamping is to be released, pressurized air is supplied to an air chamber 198, the tip end portions of the plurality of engagement members 197 are shifted outwards by the diaphragm 196 being elastically deformed upwards, and thereby the clamping is released. The other structural details, the operation, and the advantages are same as in Embodiment 1.

Embodiment 20

Figure 52:
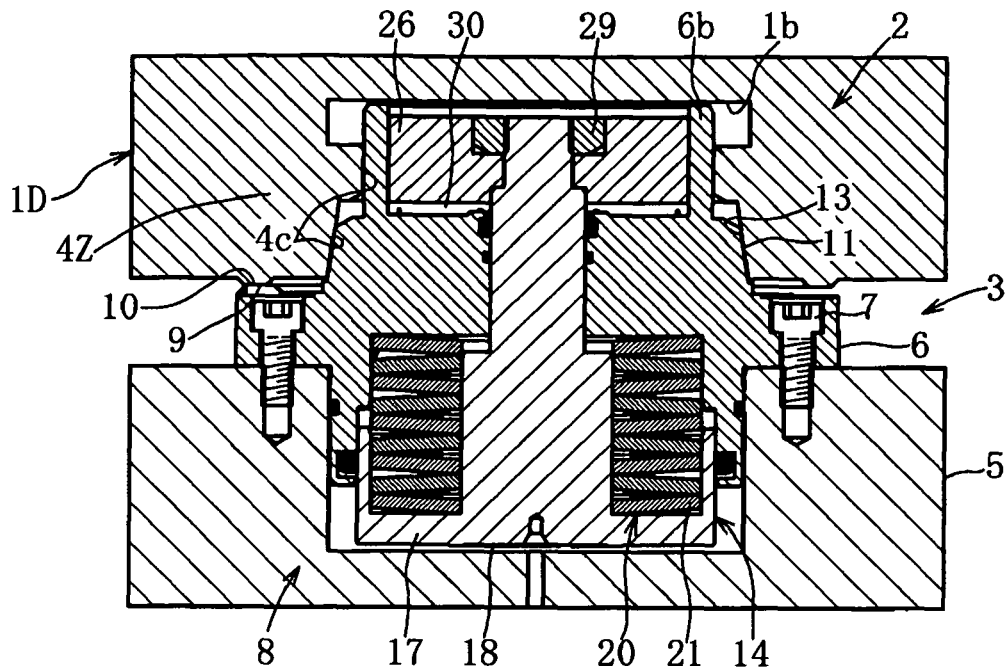
FIG. 52 is a sectional view of a work pallet and a positioning and fixing device according to Embodiment 20.
Figure 53:
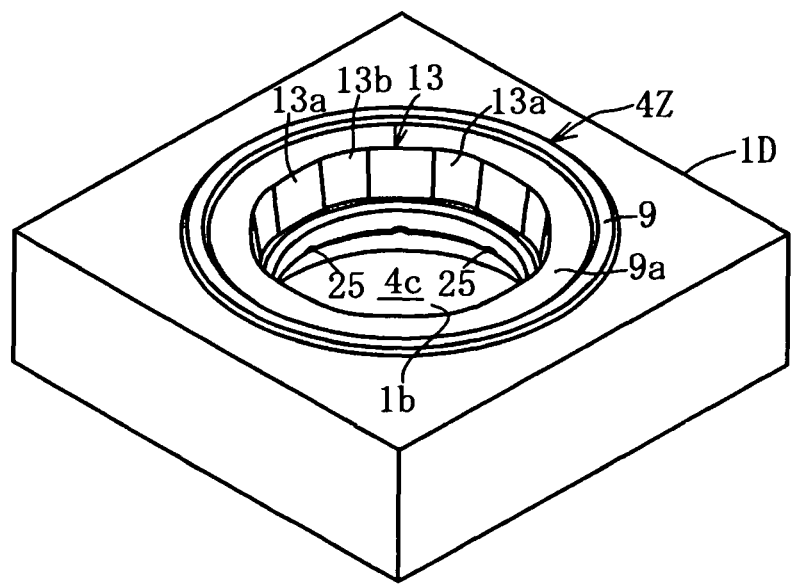
FIG. 53 is a perspective view of the work pallet as seen from its rear surface side.

A work pallet 1D in which the ring member is formed integrally with the work pallet will now be explained. As shown in FIGS. 52 and 53, this work pallet 1D is a plate member made from steel that is square in plan view and whose thickness in the vertical direction is great. A ring member 4Z is formed integrally with this work pallet 1D. A circular aperture 4c is formed in the ring member 4Z. And a circular concave portion 1b is formed on the work pallet 1D in the vicinity of this circular aperture 4c and above it. Eight ball reception grooves 25 are formed in the upper end portion of the ring member 4Z, and a tapered female engagement portion 13 whose cross section is formed as a regular octagon is formed on an internal circumferential portion of the ring member 4Z. And an annular lower end reference surface 9 is defined upon the lower end portion of the ring member 4Z, so as to surround the opening portion 1c. The other structural details, the operation, and the advantages are same as in Embodiment 1.

Next, variant embodiments in which the above embodiments are partially altered will be explained.

[1] It would be acceptable to provide a structure in which, when clamping the work pallet 1 to the base member 6, the tapered male engagement portion 11 is engaged in close contact with the tapered female engagement portion 13 by elastic deformation of the tapered male engagement portion 11 in the direction to reduce its diameter, or to provide a structure in which the tapered male engagement portion 11 and the tapered female engagement portion 13 are engaged together in close contact while both being elastically deformed.

[2] The number of ball reception holes, balls 24, ball reception grooves 25 and so on of the ball lock mechanism 15 may be varied as appropriate, according to the regular polygonal shape of the tapered male engagement portion 11.

[3] Apart from the above, a person skilled in the art will be able to implement various changes to the above embodiments with additional embodiments, without departing from the gist of the present invention; and the present invention should be understood as also including such variant embodiments.

INDUSTRIAL APPLICABILITY

The work pallet positioning and fixing device of the present invention can be utilized for positioning a work pallet that is used with a machining tool such as a machining center in three dimensions, and also for restraining its rotation about the vertical axis.

The invention claimed is:
1. A work pallet positioning and fixing device comprising:
a ring member that is provided to a work pallet;
a base member to which the ring member can engage from above; and
a clamp mechanism for fixing the ring member to the base member; and
wherein the base member positions the ring member with respect to the base member in a vertical direction and a horizontal direction and also restrains rotation of the ring member with respect to the base member about a vertical axis;
wherein the base member comprises a vertical axis, Z reference surfaces for stopping a lower end reference surface of the ring member to position the ring member in the vertical direction, and a tapered male engagement portion whose horizontal cross section is formed as a regular polygon that has a plurality of circular arcuate vertex portions that are convex outward and a plurality of side portions, and which reduces in diameter upwards, and the tapered male engagement portion is formed integrally with the base member;
wherein the ring member comprises a vertical axis and a tapered female engagement portion that is formed to be capable of engaging with the tapered male engagement portion so that the lower end reference surface comes into contact against the Z reference surfaces, and moreover whose horizontal cross section is formed as a regular polygon that has a plurality of circular arcuate vertex portions that are convex outward and a plurality of side portions, and the tapered female engagement portion is formed integrally with the ring member;
wherein the tapered female engagement portion is adapted to engage in close contact with the tapered male engagement portion, by elastic deformation in a radial direction of at least one of an external circumferential side wall portion of the tapered female engagement portion and the internal circumferential side wall portion of the tapered male engagement portion;
wherein the clamp mechanism comprises a hydraulic cylinder for clamping and a ball lock mechanism which is provided on the base member and the ring member;
wherein the ball lock mechanism comprises a barrel portion formed at an upper end portion of the base member and inserted into a circular aperture in the ring member; a plurality of ball reception holes formed in the barrel portion; a plurality of balls, each of which is held in one of the plurality of ball reception holes and is movable in the radial direction; a plurality of ball reception grooves formed on an internal circumferential portion of the upper end portion of the ring member, so as to correspond to the plurality of ball reception holes, wherein the plurality of ball reception grooves receives the plurality of balls; a circular plate member provided at an upper end portion of a piston rod of the hydraulic cylinder and disposed to slide freely up and down in the barrel portion; and a plurality of inclined portions for ball driving and a plurality of concave portions for ball retraction formed on an external circumferential portion of the circular plate member so as to correspond to the plurality of ball reception holes; and wherein the tapered male engagement portion is positioned more to the radial interior than a conical surface that contains the plurality of balls and centers in the radial directions of the Z reference surfaces.

2. A work pallet positioning and fixing device according to claim 1, wherein the plurality of ball reception holes and the plurality of balls provided to the barrel portion of the base member are positioned so as to correspond to central portions of the plurality of side portions of the tapered male engagement portion.

3. A work pallet positioning and fixing device according to claim 1 or claim 2, further comprising:
an annular air chamber defined between the base member and the circular plate member, to which pressurized air is supplied;
a plurality of air nozzles that are formed in the barrel portion, so as to communicate with the air chamber;
a plurality of horizontal air nozzles for blowing air between the lower end reference surface and the Z reference surfaces; and
a plurality of air passages that supply pressurized air from the air chamber to the plurality of horizontal air nozzles.

4. A work pallet positioning and fixing device according to claim 1, wherein the ring member has an elastic deformation promoting portion that promotes elastic deformation thereof in the direction to increase a radius of the ring member, when the plurality of side portions of the tapered female engagement portion are engaged in close contact with the plurality of side portions of the tapered male engagement portion.

5. A work pallet positioning and fixing device according to claim 4, wherein the elastic deformation promoting portion comprises a plurality of circular arcuate grooves with lower ends open that are shaped as circular arcs in plan view and are formed on a wall portion that surrounds the tapered female engagement portion.

6. A work pallet positioning and fixing device according to claim 4, wherein the elastic deformation promoting portion comprises a plurality of circular arcuate grooves with upper ends open that are shaped as circular arcs in plan view and are formed on a wall portion that surrounds the tapered female engagement portion.

7. A work pallet positioning and fixing device according to claim 4, wherein the elastic deformation promoting portion comprises an annular groove with a lower end open that is formed on a wall portion that surrounds the tapered female engagement portion.

8. A work pallet positioning and fixing device according to claim 7, further comprising a plurality of slits on an annular wall more circumferentially internal than the annular groove, spaced at intervals in a circumferential direction and oriented in the radial direction.

9. A work pallet positioning and fixing device according to claim 7, wherein the elastic deformation promoting portion comprises an annular wall more circumferentially internal than the annular groove, and an annular groove that is formed flat in the vertical direction and adjacent to the annular groove.

10. A work pallet positioning and fixing device according to claim 4, wherein the elastic deformation promoting portion comprises a plurality of slits on a wall portion that surrounds the tapered female engagement portion, formed spaced at intervals in a circumferential direction and oriented in the radial direction.

11. A work pallet positioning and fixing device according to claim 1, wherein a plurality of positioning pins oriented vertically are provided to the base member, and a plurality of pin holes into which the positioning pins are inserted, are provided in the ring member.

12. A work pallet positioning and fixing device according to claim 1, further comprising a plurality of positioning pins oriented vertically are provided to the base member, and a plurality of pin holes or notched apertures into which the positioning pins are inserted are provided in the work pallet.

13. A work pallet positioning and fixing device according to claim 1, wherein the regular polygon that is the horizontal cross section of the tapered male engagement portion is a regular octagon that has eight circular arcuate vertex portions and eight side portions.

14. A work pallet positioning and fixing device according to claim 1, wherein the regular polygon that is the horizontal cross section of the tapered male engagement portion is a regular hexagon that has six circular arcuate vertex portions and six side portions.

15. A work pallet positioning and fixing device according to claim 1, wherein the hydraulic cylinder comprises a multi-layer coned disk springs for driving the ball lock mechanism.

16. A work pallet positioning and fixing device according to claim 1 or claim 15, wherein the hydraulic cylinder comprises a hydraulic pressure operation chamber to which hydraulic pressure is supplied for driving the ball lock mechanism to unclamp the hydraulic cylinder.

17. A work pallet positioning and fixing device according to claim 1, wherein each of the plurality of side portions in the horizontal cross section of the tapered male engagement portion is formed as a circular arc that bulges slightly outward.

18. A work pallet positioning and fixing device according to claim 1, wherein each of the plurality of side portions in the horizontal cross section of the tapered male engagement portion is formed in a rectilinear shape.

19. A work pallet positioning and fixing device according to claim 1, wherein each one side portion of the plurality of side portions in the horizontal cross section of the tapered female engagement portion comprises a concave relief portion formed at a central portion of said each one side portion, and a pair of close engagement portions formed at respective ends of the concave relief portion.

20. A work pallet positioning and fixing device according to claim 1 or claim 19, wherein each of the plurality of side portions in the horizontal cross section of the tapered male engagement portion comprises a concave relief portion formed at a central portion, and a pair of close engagement portions formed at respective ends of the concave relief portion.

21. A work pallet positioning and fixing device according to claim 1, wherein said regular polygon of the tapered female engagement portion of the base member conforms to said regular polygon of the tapered male engagement portion of the ring member to restrain said rotation of the ring member with respect to the base member about the vertical axis.

* * * * *